US012647381B1

(12) United States Patent
Kamra et al.

(10) Patent No.: US 12,647,381 B1
(45) Date of Patent: Jun. 2, 2026

(54) DETERMINING ACTIONS ASSOCIATED WITH COMMUNICATIONS IN A MULTI-CHANNEL ARTIFICIAL INTELLIGENCE ARCHITECTURE

(71) Applicant: Amazon Technologies, Inc., Seattle, WA (US)

(72) Inventors: Anuj Kamra, Bellevue, WA (US); Morris Ofori-Mensah, Lynnwood, WA (US); Christopher Geiger Parker, Kihei, HI (US); Nivetha J, Coimbatore (IN); Mugunthan Govindaraju, Chennai (IN)

(73) Assignee: Amazon Technologies, Inc., Seattle, WA (US)

( * ) Notice: Subject to any disclaimer, the term of this patent is extended or adjusted under 35 U.S.C. 154(b) by 195 days.

(21) Appl. No.: 18/425,581

(22) Filed: Jan. 29, 2024

(51) Int. Cl.
H04L 51/066 (2022.01)
H04L 51/18 (2022.01)
H04L 51/224 (2022.01)

(52) U.S. Cl.
CPC ............. H04L 51/066 (2013.01); H04L 51/18 (2013.01); H04L 51/224 (2022.05)

(58) Field of Classification Search
CPC ..... H04L 51/066; H04L 51/18; H04L 51/224; H04L 51/046; G06N 20/00; G06F 40/20; G06F 40/30; G06F 40/35
See application file for complete search history.

(56) References Cited

U.S. PATENT DOCUMENTS

| | | | |
|---|---|---|---|
| 2021/0256207 A1* | 8/2021 | Dunn | G06F 16/3329 |
| 2022/0405687 A1* | 12/2022 | Matsuoka | G06Q 10/063112 |
| 2023/0064673 A1* | 3/2023 | Matsuoka | H04L 51/234 |
| 2023/0085225 A1* | 3/2023 | Matsuoka | G06Q 10/06316 704/9 |
| 2024/0029175 A1* | 1/2024 | Subrahmaniam | G06Q 40/123 |
| 2024/0394502 A1* | 11/2024 | Sami | G06Q 20/227 |

* cited by examiner

*Primary Examiner* — Johnny B Aguiar

(74) *Attorney, Agent, or Firm* — Nicholson De Vos Webster & Elliott LLP

(57) ABSTRACT

Systems and methods for multi-channel Artificial Intelligence (AI) architectures include receiving data representing a communication, such as a document. A format associated with the document may be determined. Once the format associated with the document is determined, a preprocessing model configured to process data associated with the format may be used with the data to generate text data representing the document. A first portion of the text data may be identified from the text data. A processing model may then be used to determine an action associated with the document based at least in part on the first portion of the text data. An application programming interface (API) may then be selected to send a request to for executing the action. The document may also be associated with a user account of the user such that the user may subsequently request information that may be included in the document from various devices.

20 Claims, 13 Drawing Sheets

600

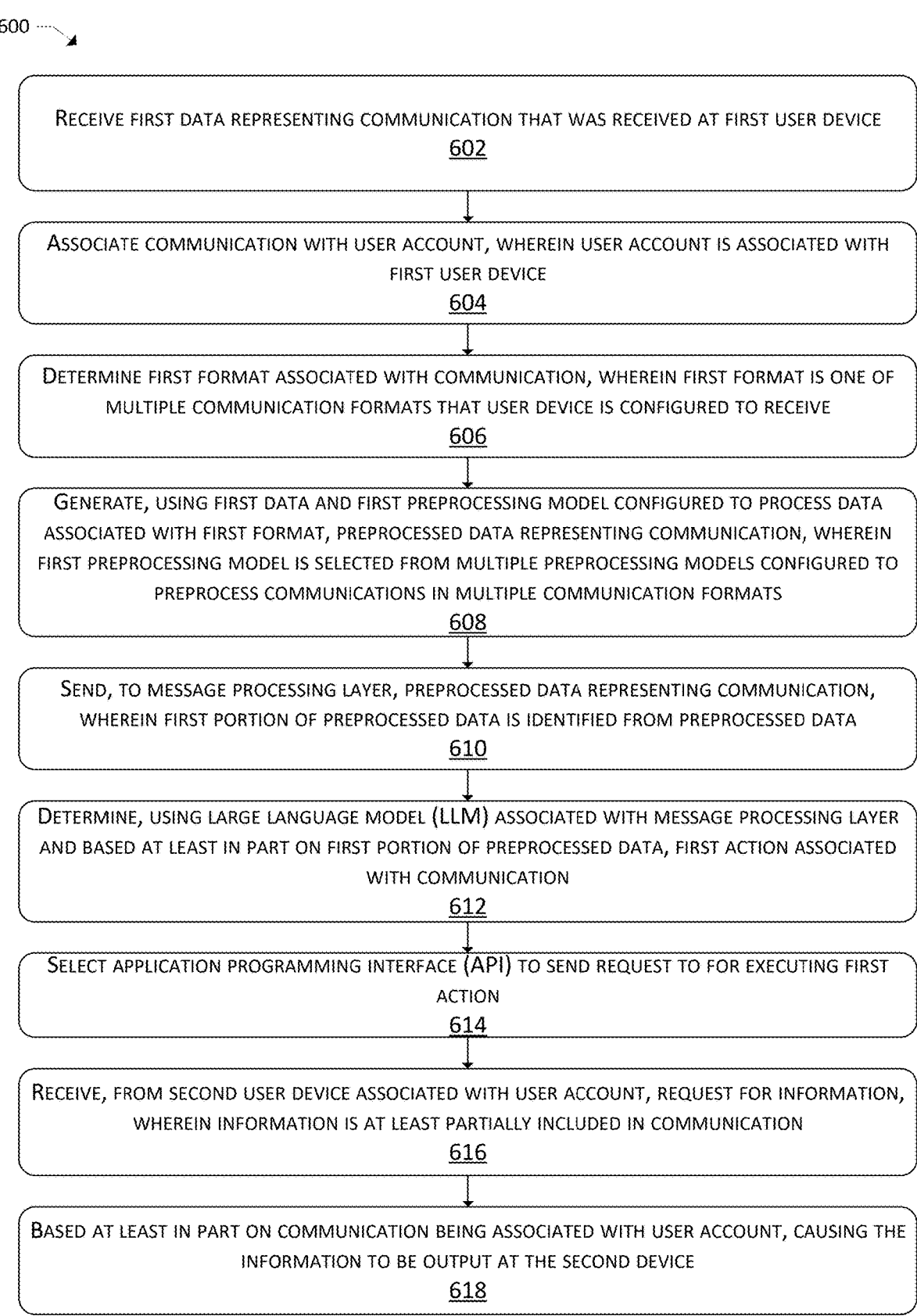

RECEIVE FIRST DATA REPRESENTING COMMUNICATION THAT WAS RECEIVED AT FIRST USER DEVICE
602

ASSOCIATE COMMUNICATION WITH USER ACCOUNT, WHEREIN USER ACCOUNT IS ASSOCIATED WITH FIRST USER DEVICE
604

DETERMINE FIRST FORMAT ASSOCIATED WITH COMMUNICATION, WHEREIN FIRST FORMAT IS ONE OF MULTIPLE COMMUNICATION FORMATS THAT USER DEVICE IS CONFIGURED TO RECEIVE
606

GENERATE, USING FIRST DATA AND FIRST PREPROCESSING MODEL CONFIGURED TO PROCESS DATA ASSOCIATED WITH FIRST FORMAT, PREPROCESSED DATA REPRESENTING COMMUNICATION, WHEREIN FIRST PREPROCESSING MODEL IS SELECTED FROM MULTIPLE PREPROCESSING MODELS CONFIGURED TO PREPROCESS COMMUNICATIONS IN MULTIPLE COMMUNICATION FORMATS
608

SEND, TO MESSAGE PROCESSING LAYER, PREPROCESSED DATA REPRESENTING COMMUNICATION, WHEREIN FIRST PORTION OF PREPROCESSED DATA IS IDENTIFIED FROM PREPROCESSED DATA
610

DETERMINE, USING LARGE LANGUAGE MODEL (LLM) ASSOCIATED WITH MESSAGE PROCESSING LAYER AND BASED AT LEAST IN PART ON FIRST PORTION OF PREPROCESSED DATA, FIRST ACTION ASSOCIATED WITH COMMUNICATION
612

SELECT APPLICATION PROGRAMMING INTERFACE (API) TO SEND REQUEST TO FOR EXECUTING FIRST ACTION
614

RECEIVE, FROM SECOND USER DEVICE ASSOCIATED WITH USER ACCOUNT, REQUEST FOR INFORMATION, WHEREIN INFORMATION IS AT LEAST PARTIALLY INCLUDED IN COMMUNICATION
616

BASED AT LEAST IN PART ON COMMUNICATION BEING ASSOCIATED WITH USER ACCOUNT, CAUSING THE INFORMATION TO BE OUTPUT AT THE SECOND DEVICE
618

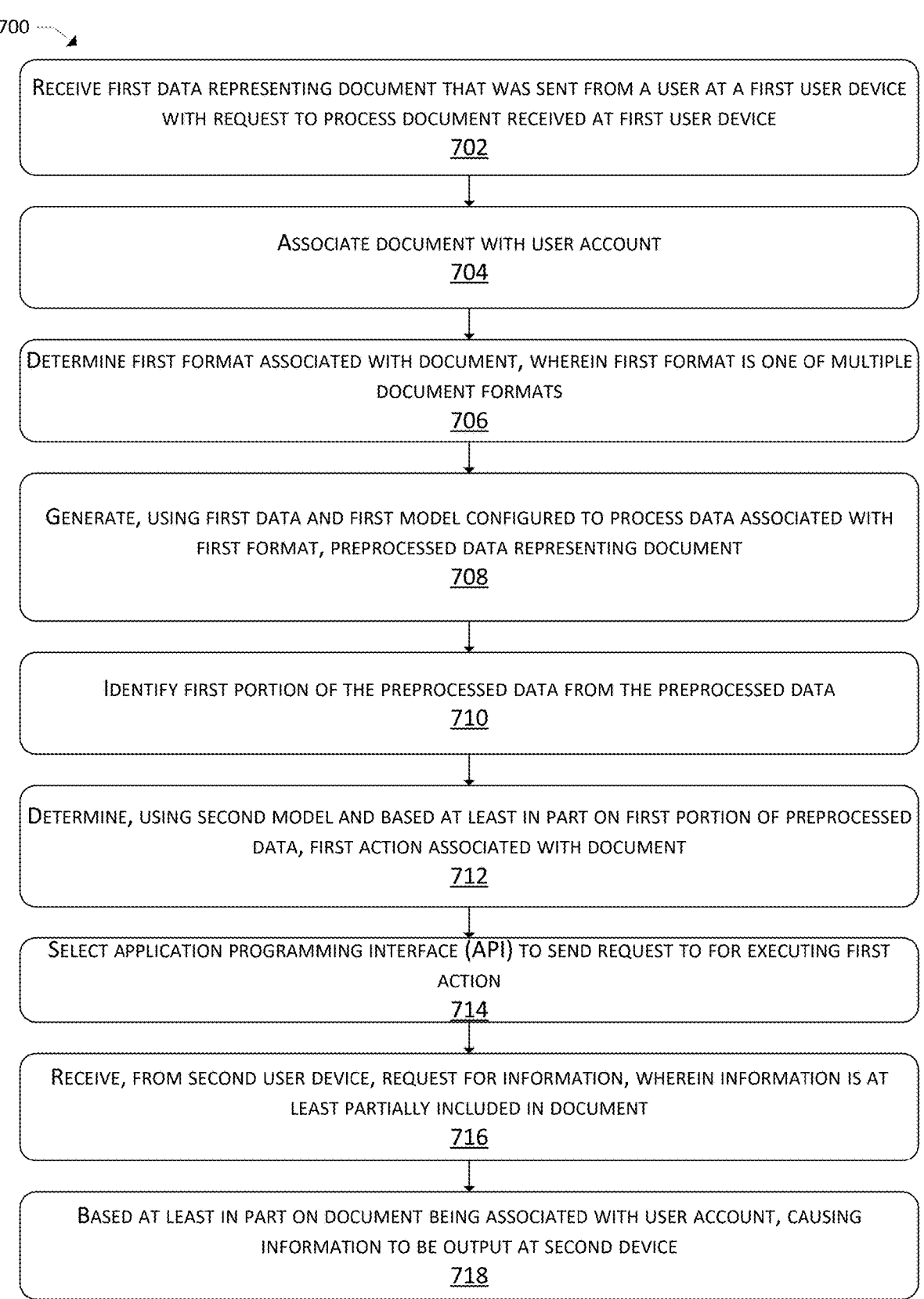

RECEIVE FIRST DATA REPRESENTING DOCUMENT THAT WAS SENT FROM A USER AT A FIRST USER DEVICE WITH REQUEST TO PROCESS DOCUMENT RECEIVED AT FIRST USER DEVICE
702

ASSOCIATE DOCUMENT WITH USER ACCOUNT
704

DETERMINE FIRST FORMAT ASSOCIATED WITH DOCUMENT, WHEREIN FIRST FORMAT IS ONE OF MULTIPLE DOCUMENT FORMATS
706

GENERATE, USING FIRST DATA AND FIRST MODEL CONFIGURED TO PROCESS DATA ASSOCIATED WITH FIRST FORMAT, PREPROCESSED DATA REPRESENTING DOCUMENT
708

IDENTIFY FIRST PORTION OF THE PREPROCESSED DATA FROM THE PREPROCESSED DATA
710

DETERMINE, USING SECOND MODEL AND BASED AT LEAST IN PART ON FIRST PORTION OF PREPROCESSED DATA, FIRST ACTION ASSOCIATED WITH DOCUMENT
712

SELECT APPLICATION PROGRAMMING INTERFACE (API) TO SEND REQUEST TO FOR EXECUTING FIRST ACTION
714

RECEIVE, FROM SECOND USER DEVICE, REQUEST FOR INFORMATION, WHEREIN INFORMATION IS AT LEAST PARTIALLY INCLUDED IN DOCUMENT
716

BASED AT LEAST IN PART ON DOCUMENT BEING ASSOCIATED WITH USER ACCOUNT, CAUSING INFORMATION TO BE OUTPUT AT SECOND DEVICE
718

FIG. 7

DETERMINING ACTIONS ASSOCIATED WITH COMMUNICATIONS IN A MULTI-CHANNEL ARTIFICIAL INTELLIGENCE ARCHITECTURE

BACKGROUND

Devices, including voice interface devices, have become available. Some of these devices may be utilized to perform actions in environments.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 illustrates a flow diagram of an example process associated with multi-channel AI architectures.

FIG. 7 illustrates a flow diagram of another example process associated with multi-channel AI architectures.

DETAILED DESCRIPTION

Figure 1:
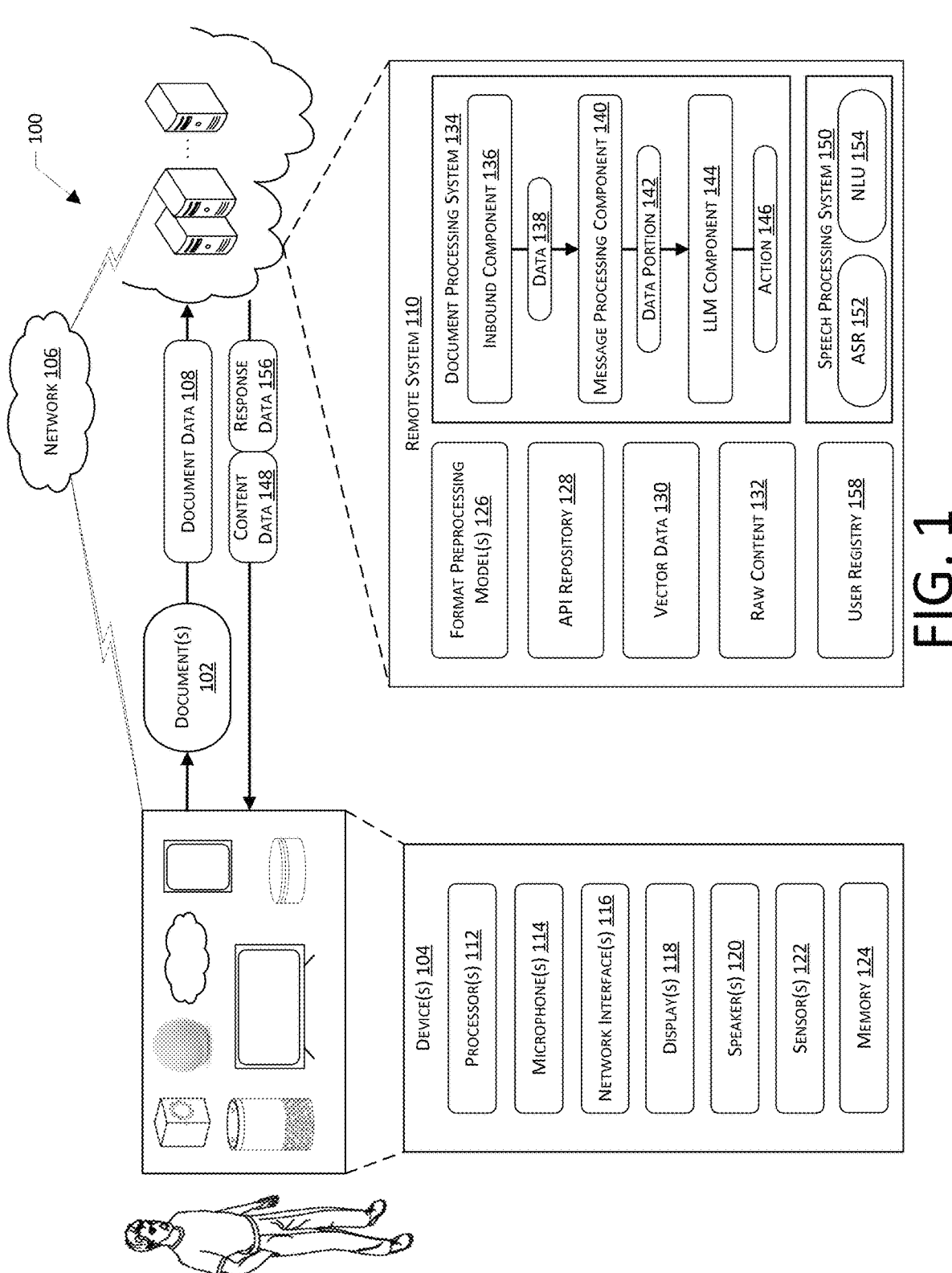
FIG. 1 illustrates a schematic diagram of an example environment for multi-channel artificial intelligence (AI) architecture.

Systems and methods for multi-channel AI architectures are disclosed, among other things. Take, for example, an environment (such as a space in and/or around a home, hotel, vehicle, office, store, restaurant, etc.) where one or more devices may be present. The devices may be utilized by one or more users or may otherwise be utilized to detect and/or control conditions associated with the environments. For example, the electronic devices may include voice interface devices (e.g., smart speaker devices, mobile phones, tablets, personal computers, televisions, appliances like refrigerators and microwaves, etc.), graphical interface devices (e.g., televisions, set top boxes, virtual/augmented reality headsets, etc.), wearable devices (e.g., smart watch, earbuds, healthcare devices), transportation devices (e.g., cars, bicycles, scooters, etc.), televisions and/or monitors, smart thermostats, security systems (including motion sensors and open/close sensors, including sensors that indicate whether a security system is armed, disarmed, or in a "home mode"), smart cameras (e.g., home security cameras), and/or touch interface devices (tablets, phones, steering wheels, laptops, kiosks, billboard, other devices with buttons, etc.). Some devices can be multiple types of those noted above.

In these and other scenarios, a remote system may be configured to receive a communication from a user and to generate an appropriate action associated with the communication. Generally, the communication may be a document, email, image, PDF, short message service (SMS) message, audio call, and the like. Further, the communication may include an attachment that is a document, email, Portable Document Format (PDF), Uniform Resource Locator (URL), and the like. Additionally, or alternatively, the communication may be an input at a website and/or a voice utterance of the user. In some examples, a communication processing system may be implemented according to a split architecture where a device may be used by a user to send a communication, while one or more processes may be performed on the corresponding communication data using a backend, server-based implementation. For example, the communication processing system may include one or more network-based computing devices positioned at a remote, cloud-based location. In examples, the communication processing system may extract communication data from a user device with permission and/or upon explicit request by the user. Additionally, or alternatively, when the communication is a voice utterance of the user, audio processing may be used. For example, the audio processing may include the use of automatic speech recognition (ASR) processes and/or natural language understanding (NLU) processes to determine an intent associated with the voice utterance.

The communication data may be sent to components of the communication processing system for preprocessing, such as at an inbound component. The communication processing system may be configured to preprocess the communication data received and/or extracted from the user. Communication data may be input into the inbound component, and normalized data representing the communication may be output. In examples, the preprocessing of the communication data may be specific to the format of the communication. For example, one preprocessing model may be used to preprocess communication data for communications in an email format. Additionally, or alternatively, a different preprocessing model may be used to preprocess communication data for communications in SMS message format. In this example, the communication processing system may identify the format of the communication. Once the format of the communication is identified, the communication processing system may use the corresponding preprocessing model in order to normalize the communication data. Communication data may be normalized so that it may be processed downstream by a message processing component of the communication processing system. For example, the communication processing system may receive and/or extract communication data where the communication is an email. The language used in an email may be more formal and detailed than other types of communications (e.g., "remind me that the basketball game is tonight, December 6$^{th}$ at 6:00 P.M."). The inbound component may normalize the email communication data and output preprocessed data, where the preprocessed data includes certain attributes of the communication data. In another example, the communication processing system may receive and/or extract communication data where the communication is an SMS message. The language used in a SMS message may include abbreviations, slang, and the like (e.g., "b-ball game 2nite @6"). The inbound component may normalize the SMS message communication data and output preprocessed data, where the preprocessed data also includes certain attributes of the communication data. In this way, the preprocessed data of the email and the preprocessed data of the SMS message may be processed by the same message processing component. Upon receiving the preprocessed data, the message processing component may extract a portion of the preprocessed data that represents the contents of PDFs, images, URLs, etc. that may be included with the communication. Additionally, or alternatively, the message processing component may extract a portion of the preprocessed data that represents the content of the communication itself.

Continuing from the example above, the message processing component may be associated with and/or include a large language model (LLM) or otherwise may be configured to generate content and/or responses based on inputs such as prompts. In this example, the LLM may intake a prompt associated with a given communication (e.g., a recipe in a PDF) and may determine an action based at least in part on the portion of preprocessed data received from the message processing component and how the LLM is trained to respond to the communication of the user. Using the prompt and the portion of preprocessed data representing the user communication, the LLM may output an action plan. The action plan may be used to generate and cause the execution of a request (e.g., an application programming interface (API) call(s)). Additionally, or alternatively, the action plan may be used to generate content data. In this example, the content data may represent confirmation content that is to be presented to the user. For example, the message processing component may use the content data to display a confirmation notification on the user device (e.g., "recipe has been added to your recipe library"). Further, the message processing component may use the content data to present to the user the confirmation notification using the same format as the initial user communication. For example, if the user communication was a SMS message on a mobile device, the confirmation notification may be presented to the user as a SMS message response. Additionally, or alternatively, if the user communication was a voice utterance to a voice interface device, the confirmation notification may be presented to the user as a voice response on the voice interface device.

The communication processing system may be also configured to identify and/or store user preferences. In examples, a user communication may include explicit preferences and/or implicit preferences. The communication processing system may store data representing the explicit and implicit preferences of the user. Additionally, or alternatively, the LLM associated with the communication processing system may be configured to use the preference data in determining an action plan.

After the LLM has determined the action plan and the confirmation notification has been presented to the user, the communication processing system may generate and/or store vector representations of the data representing user communications. For example, the vectors may represent information included in the body of a user communication and/or information included as an attachment with the user communication. These vector representations may also be stored in a vector database. Additionally, or alternatively, the stored vector representations may be used to determine a response to user commands (e.g., requests, questions, etc.). For example, the user command may be a voice command to a voice interface device, where the user requests the device to provide certain information. The communication processing system may also generate a vector representation of the user command. The vector representation of the user command may then be compared to the stored vector representations of data to determine an appropriate response to the user. For example, the communication processing system may determine which stored vector representations have the shortest "distance" to the vector representation of the user command. The smaller the distance, the closer in similarity the data may be to the user command. Further, similar data and user commands may indicate the most appropriate response to the user command.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment 100 for multi-channel AI architectures. The environment 100 may include, for example, device(s) 104. In certain examples, the device(s) 104 themselves may be any one or more of a voice interface device (e.g., smart speaker devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In some examples, the devices may be situated in a home, place of business, healthcare facility (e.g., hospital, doctor's office, pharmacy, etc.), in a vehicle (e.g., airplane, truck, car, bus, etc.), and/or in a public forum (e.g., shopping center, store, hotel, etc.), for example. In some nonlimiting examples, at least some of the device(s) 104 may be multi-modal devices that may be configured to capture audio representing user utterances and/or to capture user input by a display or otherwise.

The device(s) 104 may be configured to send data to and/or receive data from remote component(s) of a system 110, such as via a network 106. It should be understood that where operations are described herein as being performed by the remote component(s) of the system 110, some or all of those operations may be performed by the device(s) 104. It should also be understood that anytime the remote component(s) of the system 110 are referenced, that system may include any system and/or device, whether local to an environment of the devices or remote from that environment. Additionally, it should be understood that a given space and/or environment may include numerous devices. It should also be understood that when a "space" or "environment" is used herein, those terms mean an area of any size and delineation and can include but are not necessarily limited to a given room, building, or other structure, unless otherwise specifically described as such.

The device(s) 104 may include one or more components, such as, for example, one or more processors 112, one or more network interfaces 116, memory 124, one or more microphones 114, one or more speakers 120, one or more displays 118, and/or one or more sensors 122. The microphones 114 may be configured to capture audio, such as user utterances, and generate corresponding audio data. The speakers 120 may be configured to output audio, such as audio corresponding to audio data received from another device. The displays 118 may be configured to display images corresponding to image data, such as image data received from the remote component(s) of the system 110 as well as user interface elements that may be configured to receive user input indicating selection of such user interface elements and/or provision of queries. The device(s) 104 may be configured to detect an environmental condition associated with the environment utilizing the sensors 122. Some example sensors 122 that may be utilized to detect conditions may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors 122, usage data and/or account data may be utilized to determine if an environmental condition is present. In some examples, the sensors 122 may also include radar and/or ultrasonic sensors. The sensors 122 may be configured to generate context data.

It should be understood that while several examples used herein include a voice-enabled device that allows users to interact therewith via user utterances, one or more other devices, which may not include a voice interface, may be utilized instead of or in addition to voice-enabled devices. In these examples, the device(s) 104 may be configured to send and receive data over the network 106 and to communicate with other devices in the environment 100. As such, in each instance where a voice-enabled device is utilized, a computing device that does not include a voice interface may also or alternatively be used. It should be understood that when voice-enabled devices are described herein, those voice-enabled devices may include phones, computers, and/ or other computing devices.

The remote component(s) of the system 110 may include components such as, for example, a document processing system 134, a format preprocessing model 126, a speech processing system 150, an API repository 128, vector data 130, raw content 132, and/or a user registry 158. It should be understood that while the components of the remote component(s) of the system 110 are depicted and described as separate from each other in FIG. 1, some or all of the components may be a part of the same system. The speech processing system 150 may include an automatic speech recognition component (ASR) 152 and/or a natural language understanding component (NLU) 154. Each of the components described herein with respect to the remote component(s) of the system 110 may be associated with their own systems, which collectively may be referred to herein as the remote component(s) of the system 110, and/or some or all of the components may be associated with a single system. Additionally, the remote component(s) of the system 110 may include one or more applications, which may be described as skills. "Skills," as described herein may be applications and/or may be a subset of an application. For example, a skill may receive data representing an intent. For example, an intent may be determined by the NLU component 154 and/or as determined from user input via a computing device. Skills may be configured to utilize the intent to output data for input to a text-to-speech (TTS) component, a link or other resource locator for audio data, and/or a command to a device, such as smart devices. "Skills" may include applications running on devices, such as the smart devices, and/or may include portions that interface with voice user interfaces of smart devices.

In instances where a voice-enabled device is utilized, skills may extend the functionality of smart devices that can be controlled by users utilizing a voice-user interface. In some examples, skills may be a type of application that may be useable in association with target devices and may have been developed specifically to work in connection with given target devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

Additionally, the operations and/or functionalities associated with and/or described with respect to the components of the remote component(s) of the system 110 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the remote component(s) of the system 110, the user registry 158 may be configured to determine and/or generate associations between users, user accounts, environment identifiers, and/or devices. For example, one or more associations between user accounts may be identified, determined, and/or generated by the user registry 158. The user registry 158 may additionally store information indicating one or more applications and/or resources accessible to and/or enabled for a given user account. Additionally, the user registry 158 may include information indicating device identifiers, such as naming identifiers, associated with a given user account, as well as device types associated with the device identifiers. The user registry 158 may also include information indicating user account identifiers, naming indicators of devices associated with user accounts, and/or associations between devices, such as the smart devices. The user registry 158 may also include information associated with usage of the smart devices. It should also be understood that a user account may be associated with one or more than one user profiles. It should also be understood that the term "user account" may be used to describe a set of data and/or functionalities associated with a given account identifier. For example, data identified, determined, and/or generated while using some or all of the environment 100 may be stored or otherwise associated with an account identifier. Data associated with the user accounts may include, for example, account access information, historical usage data, device-association data, and/or preference data.

The speech-processing system 150 may be configured to receive audio data from the device(s) 104 and/or other devices and perform speech-processing operations. For example, the ASR component 152 may be configured to generate text data or other ASR output data corresponding to the audio data, and the NLU component 154 may be configured to generate intent data or other NLU output data corresponding to the audio data. In examples, intent data or other NLU output data may be generated that represents the audio data, such as without the generation and/or use of text data or other ASR output data. The intent data or other NLU output data may indicate a determined intent associated with the user utterance as well as a payload and/or value associated with the intent. For example, for a user utterance of "how old is Actor A," the NLU component 154 may identify a "information retrieval" intent. In this example where the intent data or other NLU output data indicates an intent to retrieve information associated with Action A, the speech processing system 150 may call one or more applications to effectuate the intent. Skills, as described herein may otherwise be described as applications and may include functionality for utilizing intent data or other NLU output data to generate directives and/or instructions.

The components of the environment 100 are described below by way of example. To illustrate, device 104 may be a device that is configured to receive a communication, such as document 102, from a user and be in communication with a remote system 110 in order to generate an appropriate action associated with the communication data. In some examples, the user may use the device 104 in order to share document 102 to remote system 110. Additionally, or alternatively, the user may share the document 102 with the remote system 110 directly. The remote system 110 may also obtain the document 102 from a different system and/or a different device.

In environment 100, a user is communicating via the device 104 and sharing document 102 with the remote system 110. While the communication is depicted as document 102, it should be noted that the communication may be an email, image, PDF, SMS message, input at a website, voice utterance, and the like. Document 102 may also be included in the communication as an attachment, URL link, and the like. For example, the document 102 may be included in the communication as an attachment, where the body of the communication includes a request that the document 102 be processed. In some instances, the user may communicate with the remote system 110 by directly sending an SMS message to a phone number associated with the remote system 110. Additionally, or alternatively, the user may communicate with the remote system 110 by directly sending an email to an email alias associated with the remote system 110. The SMS message and/or the email may include information that the user wishes to share with the remote system 110 in the body of the communication and/or as an attachment. In another example, the user may communicate with the remote system 110 directly by speech utterance at the device 104, where the speech utterance may include a wake word associated with the device 104 and the information the user wishes to share with the remote system 110 (e.g., "remember there is a play at the school tomorrow"). Additionally, or alternatively, the user may communicate with the remote system by using a website associated with the remote system 110, and directly providing information at the website.

Services provided by device 104 in conjunction with the remote system 110 may include performing actions or activities, displaying media content, providing information via the device 104, and/or initiating Internet-based services on behalf of the user. In some examples, document processing system 134 may be implemented according to a split architecture where the device 104 receives document 102, while one or more processes may be performed on the document data 108 using a backend, server-based implementation. For example, the document processing system 134 may be associated with one or more network-based computing devices positioned at a remote, cloud-based location, such as remote system 110.

In another example, the document processing system 134 may extract communication data from the user, such as from device 104 and/or a different user device, with permission and/or upon explicit request by the user. As described in more detail below with respect to FIG. 4, the document processing system 134 may extract data associated with an email, screenshot, SMS message, and the like, without the user having to actively send the communication to the remote system 110. The user may be able to provide permissions to the document processing system 134 all at once, or on a case-by-case basis (e.g., can access photo album, but cannot access email).

Additionally, or alternatively, when the communication is a voice utterance of the user, audio processing may be used. For example, the audio processing may include the use of automatic speech recognition (ASR) 152 processes and/or natural language understanding (NLU) 154 processes. In such examples, the user may not send document 102 or other types of communication such as emails, images, PDFs, SMS messages, website input, etc. Instead, the user may communicate with the device 104 as a voice-enabled device that is configured to detect speech utterances. Device 104 as a voice enabled device may detect a speech utterance of a user. The speech utterance may include a request such as "remind me I have an appointment tomorrow." The voice-enabled device 104 may then send the audio signal to be processed by the ASR 152 and/or NLU 154.

When the user has sent document 102 to the remote system 110, the document data 108 may be sent to components of the document processing system 134 for preprocessing, such as inbound component 136. In some examples, the inbound component 136 may be associated with a remote system, such as document processing system 134, and configured to receive document data 108 from the user. The document processing system 134 may be configured to preprocess the document data 108 received and/or extracted from the user. Document data 108 may be input into the inbound component 136 at the document processing system 134, and normalized data 138 representing the communication is the output, where the data 138 output may be used by the message processing component 140. The data 138 may include text data, image data, etc. In this example, data 138 is normalized by the inbound component 136 to be in a format that is usable by the message processing component 140. In some examples, the preprocessing of the document data 108 may be specific to the format of the communication. For example, one preprocessing model of the format preprocessing model(s) 126 may be used to preprocess document data 108 for communications in document format, such as document 102. In this example, the document processing system 134 may identify the format of document 102 or the means by which document 102 was sent. Once the format of document 102 is identified, the document processing system 134 may use the corresponding preprocessing model of format preprocessing models 126 in order to normalize the document data 108. In this example, document data 108 is normalized so that it may be processed downstream by a single message processing component 140 of the document processing system 134. The inbound component 136 may normalize the document data 108 and output data 138, where the data 138 includes certain attributes of the document data 108. It should be noted that while data 138 is described as a type of data output of the inbound component 136, the components of the document processing system 134 may use any suitable format of data.

In one example, the user sending document 102 to the remote system 110 may have an account that is registered with the document processing system 134. The document processing system 134 may be configured to verify that the document 102 is from the user of the registered account, such as by comparing the user identity to the user registry 158. Additionally, or alternatively, the document processing system 134 may be configured to associate the document 102 with a certain registered account, even if the document 102 may have been sent from a different user. For example, the document 102 may contain information that is applicable to a registered account that is associated with a certain application (e.g., a user may send a SMS message with information to be added to a calendar, where the user shares a calendar with a different user, and the calendar is associated with the account of the different user). The document processing system 134 may determine the appropriate user account to associate with the document 102.

After document data 108 has been normalized as data 138 that is usable by the message processing component 140, the message processing component 140 may receive the data 138 from the inbound component 136. The message processing component 140 may be associated with a remote system, such as the document processing system 134 and configured to receive data 138 from the inbound component 136. In some examples, the message processing component 140 may be configured to receive text data, image data, etc. Data 138 may be input into the message processing component 140 at the document processing system 134, and a data portion 142 is an output. The message processing component 140 may determine the data portion 142 using optical character recognition, computer vision, and the like. Additionally, or alternatively, the message processing component 140 may receive document data 108, and store the document data 108 as raw content 132. When the message processing component stores the document data 108 as raw content 132, the document data 108 may only be kept for a predetermined amount time. Further, the user may request that the document data 108 be removed from the raw content 132 within the predetermined amount of time.

Upon receiving the data 138, the message processing component 140 may extract data portion 142 that represents the contents of PDFs, images, URLs, etc. that may be included with the document 102. The data portion 142 may be metadata associated with the document 102. Additionally, or alternatively, the message processing component may extract a portion of the text data that represents the content of the document 102 itself.

The message processing component 140 may be associated with and/or include a large language model (LLM) 144 or otherwise is configured to generate content and/or responses based on inputs such as prompts. In this example, the LLM component 144 may intake a prompt associated with the data portion 142 and may determine a response 156 based at least in part on the data portion 142 received from the message processing component 140 and how the LLM component 144 is trained to respond to the document 102 of the user. In some examples, the message processing component 140 may provide the LLM 144 with a set of instructions for processing the data portion 142. The set of instructions may be included in the prompt that is used by the LLM 144 in determining the response 156 based on the data portion 142. Additionally, or alternatively, the LLM 144 may use optical character recognition, computer vision, and the like in order to determine the response 156.

Using the prompt and data portion 142 representing the document 102, the LLM component 144 may output an action 146. The action 146 may be used to generate and cause the execution of a request (e.g., an API call(s)). Further, once API calls(s) are identified by the action 146, the API calls(s) and the associated data portion 142 may be stored in an API repository 128. The action 146 may indicate an API call to an application, which may be executed when the user later makes a request. For example, the document 102 sent by the user may include a birthday party invitation. Based on the data portion 142, the action 146 may indicate an API call to a calendar application, which may be executed when the user later requests information on the birthday party. Additionally, or alternatively, the action 146 may be used to generate content data 148. In this example, the content data 148 may represent confirmation content that is to be presented to the user. For example, the message processing component 140 may use the content data 148 to cause a confirmation notification to be displayed on the device 104 (e.g., "recipe has been added to your recipe library"). The confirmation notification may also include specific information related to the document 102 (e.g., the notification includes a text and/or depiction of the recipe). Further, the message processing component 140 may use the content data 148 to present to the user the confirmation notification using the same format in which document 102 was sent. For example, if the document 102 was sent with an email, the confirmation notification may be presented to the user as an email response. Additionally, or alternatively, the contents of the confirmation notification may vary depending on the format of the communication.

After the LLM component 144 has determined the action 146 and the content data 148 has been sent to device 104 to present a confirmation notification, the document processing system 134 may generate and/or store vector representations of the text data representing the document 102. The vector representations may be stored as vector data 130. For example, the vector data 130 may represent information included in document 102, such as the data portion 142. Additionally, or alternatively, the vector data 130 may be used to generate response data 156 in order to respond to user commands (e.g., requests, questions, etc.). For example, the user command may be a voice command to device 104, where the user requests the device 104 to provide certain information. The document processing system 134 may generate a vector representation of the user command, and compare the vector representation of the user command to vector data 130 to determine an appropriate response to the user. For example, the document processing system 134 may determine which vector data 130 has the smallest "distance" between the vector representation of the user command. The smaller the distance, the closer in similarity the vector data 130 may be to the user command. Further, similar vector data 130 and user commands may indicate the most appropriate response to the user command. In some examples, other calculations may be performed, such as finding a cosine of an angle between two vectors. When the document processing system 134 determines the vector data 130 with the closest similarity, the document processing system 134 may generate response data 156, and a response may be provided to the user via device 104. For example, the document processing system 134 may generate response data 156 based on the vector data 130 with the closest similarity, the data portion 142 represented by the similar vector data 130, as well as the API calls(s) stored in the API repository 128 that is associated with the data portion 142. Further, the response data 156 may indicate the format in which the response is to be delivered to the deliver (e.g., by voice, email, SMS message, etc.).

As used herein, the one or more processes performed by the device(s) 104 and/or the remote component(s) of the system 110 may include the use of models. These models may be machine learning models. For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained utilizing a training dataset associated with prior user input data. The models may be trained for multiple user accounts and/or for a specific user account. As such, the machine learning models may be configured to learn, without human intervention, attributes of collected data and/or actions taken associated with device usage cessation.

It should be noted that while text data or other ASR output data is described as a type of data utilized to communicate between various components of the remote component(s) of the system 110 and/or other systems and/or devices, the components of the remote component(s) of the system 110 may use any suitable format of data to communicate. For example, the data may be in a human-readable format, such as text data or other ASR output data formatted as extensible markup language (XML), speech synthesis markup language (SSML), and/or other markup language, or in a computer-readable format, such as binary, hexadecimal, etc., which may be converted to text data or other ASR output data for display by one or more devices such as the devices.

As shown in FIG. 1, several of the remote component(s) of the system 110 and the associated functionality of those components as described herein may be performed by one or more of the device(s) 104. Additionally, or alternatively, some or all of the components and/or functionalities associated with the device(s) 104 may be performed by the remote component(s) of the system 110.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 112 and/or the processor(s) described with respect to the components of the system 110, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 112 and/or the processor(s) described with respect to the components of the system 110 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 112 and/or the processor(s) described with respect to the components of the system 110 may possess its own local memory, which also may store program components, program data, and/or one or more operating systems.

The memory 124 and/or the memory described with respect to the components of the system 110 may include volatile and nonvolatile memory, removable and non-removable media implemented in any method or technology for storage of information, such as non-transitory computer-readable instructions, data structures, program component, or other data. Such memory 124 and/or the memory described with respect to the components of the system 110 may include, but is not limited to, random access memory (RAM), read-only memory (ROM), electrically erasable programmable read-only memory (EEPROM), flash memory or other memory technology, compact disc-read only memory (CD-ROM), digital versatile disc (DVD) or other optical storage, magnetic cassettes, magnetic tape, magnetic disk storage or other magnetic storage devices, redundant array of independent disks (RAID) storage systems, or any other medium which can be used to store the desired information and which can be accessed by a computing device. The memory 124 and/or the memory described with respect to the components of the system 110 may be implemented as computer-readable storage media ("CRSM"), which may be any available physical media accessible by the processor(s) 112 and/or the processor(s) described with respect to the system 110 to execute instructions stored on the memory 124 and/or the memory described with respect to the components of the system 110. In one basic implementation, CRSM may include RAM and Flash memory. In other implementations, CRSM may include, but is not limited to, ROM, EEPROM, or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 124 and/or the memory described with respect to the components of the system 110, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 116 and/or the network interface(s) described with respect to the components of the system 110 may enable messages between the components and/or devices shown in environment 100 and/or with one or more other polling systems, as well as other networked devices. Such network interface(s) 116 and/or the network interface(s) described with respect to the components of the system 110 may include one or more network interface controllers (NICs) or other types of transceiver devices to send and receive messages over the network 106.

For instance, each of the network interface(s) 116 and/or the network interface(s) described with respect to the components of the system 110 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 116 and/or the network interface(s) described with respect to the components of the system 110 may include a wide area network (WAN) component to enable message over a wide area network.

In some instances, the remote component(s) of the system 110 may be local to an environment associated the devices. For instance, the remote component(s) of the system 110 may be located within one or more of the first user device(s) 104 and/or the smart devices. In some instances, some or all of the functionality of the remote component(s) of the system 110 may be performed by one or more of the devices. Also, while various components of the system 110 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2:
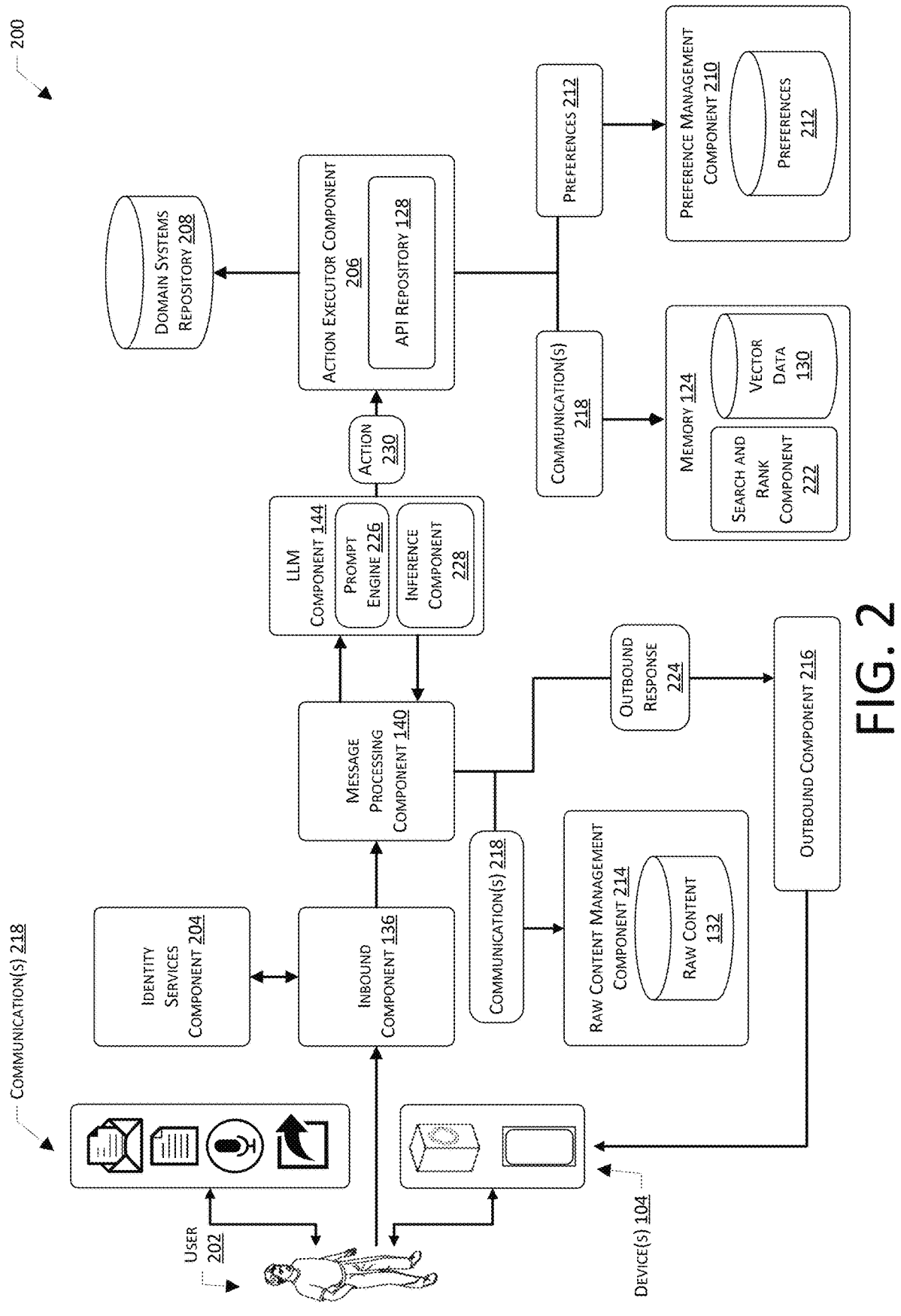
FIG. 2 illustrates a conceptual diagram of components utilized for multi-channel AI architectures.

FIG. 2 illustrates a conceptual diagram of components utilized for multi-channel AI architectures. As illustrated in environment 200, a remote system may be configured to receive a communication 218 from the user 202 and determine an outbound response 224 to be presented via device 104. The communication 218 may be a document, email, image, PDF, short message service (SMS) message, and the like. Further, the communication 218 may include an attachment that is a document, email, PDF, URL, and the like. Additionally, or alternatively, the communication may be an input at a website and/or a voice utterance of the user. When the user 202 sends the communication 218 via the device 104, an inbound component 136 of a communication processing system may receive data of the communication 218 to be preprocessed. For example, the inbound component 136 may be configured to normalize the data of the communication 218, such that one message processing component 140 may be used. Additionally, or alternatively, the inbound component 136 may be associated with a remote system and configured to receive the data of communication 218 from the user 202. The data of communication 218 may be input into the inbound component 136, and normalized data representing the communication 218 may be output, where the normalized data may be used by the message processing component 140.

The inbound component 136 may also be associated with an identity service component 204 that is configured to verify the identity of the user 202 sending the communication. For example, the user 202 may send an email via the device 104, where the email indicates an email address of the user. The inbound component 136 may use, or work in conjunction with, the identity services component 204 in order to verify that the email belongs to the user 202. For example, the inbound component 136 may detect that the email is a spoofed email, and not legitimately from the user. Additionally, or alternatively, the user 202 may have an account that is registered with the communication processing system. In this example, the inbound component 136 may use, or work in conjunction with, the identity services component 204 in order to verify that the communication 218 is from the user 202 of the user account. In another example, the identity services component 204 may be used to detect malicious or phishing messages. Additionally, or alternatively, the document processing system 134 may be configured to associate the document 102 with a certain registered account, even if the document 102 may have been sent from a different user 202. For example, the document 102 may contain information that is applicable to a registered account that is associated with a certain application (e.g., the user 202 may send a SMS message with information to be added to a calendar, where the user 202 shares a calendar with a different user, and the calendar is associated with the account of the different user). The document processing system 134 may determine the appropriate user account to associate with the document 102.

After the communication 218 data has been normalized and/or the communication 218 has been verified, a message processing component 140 may receive the normalized communication 218 data. The message processing component 140 may be associated with a remote system and configured to receive communication 218 data from the inbound component 136. Communication 218 data may be input into the message processing component 140 at the remote system, and metadata may be an output. For example, the communication 218 may be presented as text that includes only certain attributes. Upon receiving the normalized communication data, the message processing component 140 may extract metadata from the normalized communication data. For example, if the communication 218 included an attachment and/or embedded URL, the message processing component 140 may extract metadata representing the contents included in the attachment and/or embedded URL. Additionally, or alternatively, the message processing component 140 may extract metadata representing the contents of the communication 218 itself. The message processing component 140 may determine the metadata using optical character recognition, computer vision, and the like.

The message processing component 140 may also store the data of communication 218 as raw content 132 via the raw content management component 214. Raw content 132 may be kept by the raw content management component 214 for a predetermined amount of time. This way, the user 202 may request that the device 104 display the raw content 132. Further, the user 202 may request that the communication 218 data be removed from the raw content 132 within the predetermined amount. Additionally, or alternatively, the predetermined amount of time that the data of the communication 218 may vary depending on the format and/or contents of the communication 218. For example, if the communication 218 is a large PDF file, such communication 218 may be kept for a shorter period of time than when the communication is a small SMS message. Further, if the communication 218 contains sensitive information (e.g., medical information, personal addresses, facial images, etc.), the raw content 132 may be kept for a shorter period of time, or may not be kept at all.

The message processing component 140 may also be associated with and/or include LLM component 144 in order to generate an outbound response 224 based on inputs such as inputs from prompt engine 226. For example, the LLM component 144 may intake a prompt generated by the prompt engine 226. Using the prompt and the metadata extracted by the message processing component 140 representing the contents of the communication 218, the inference component 228 may be configured to determine an appropriate action 230 for the communication 218. For example, the prompt engine 226 may generate a prompt indicating that an appropriate action 230 for a communication 218 related to parties may be an API call(s) to calendar applications and/or domain services. In turn, when the communication 218 is received by the device 104, and the communication 218 is related to a birthday party, the inference component 228 may determine the action 230 to be the API call(s) to the calendar applications and/or domain services.

Once the action 230 is determined by the LLM component 144, the action executor component 206 may use the action 230 to determine an appropriate response to the user 202. For example, the action executor component 206 may determine the content of the response and/or the appropriate communication channel based on the API repository 128 (i.e., the API call(s) that are associated with certain metadata of communications 218). The action executory component 206 may also determine the content of the response and/or the appropriate communication channel using, or working in conjugation with, the domain systems repository 208 (i.e., domain services that are associated with certain metadata of communications 218). For example, if the communication 218 was a voice command, the action executor component 206 may determine that the appropriate communication channel is a voice output, with the device 104 being a voice-interface device. In this example, if the voice command involves a date, the action executor component 206 may use the API repository 128 and execute API calls(s) to calendar applications and/or domain services.

The action executory component may also be configured to identify and/or store user preferences 212. For example, the action executory component 206 may use, or work in conjunction with, preference management component 210 to identify and/or store preferences 212. In one example, communication 218 may include explicit preferences (e.g., "this is my favorite brand of peanut butter," "I really want to travel to Florence, Italy," etc.). Additionally, or alternatively, the communication 218 may include implicit preferences (e.g., a preferred format of communication, a preferred time of communication, points of interest, etc.). For example, the communication 218 may typically be in the format of a SMS message instead of a voice utterance and/or an email. In this instance, the action executor component 206 may identify the implicit preference of the user 202 to communicate via SMS messages. In another example, the communication 218 may often include content related to a certain type of food (e.g., Italian cuisine). In this instance, the action executor component 206 may identify the implicit preference of the user 202 to cook Italian dishes. Additionally, or alternatively, the LLM component 144 may use the preferences 212 in determining the action 230.

The action executor component 206 may generate and/or store vector data 130, where the vector data 130 includes vector representations of the communication 218. The search and rank component 222 may use the vector data 130 in order to determine a response to user commands (e.g., requests, questions, etc.). For example, the user command may be a voice command to device 104, where the user 202 requests the device 104 to provide certain information (e.g., "how do I make recipe A"). The search and rank component 222 may generate a vector representation of the user command. The vector representation of the user command may then be compared to the vector data 130 to determine the appropriate response (e.g., the ingredients and steps to recipe A) to the user 202.

Additionally, or alternatively, the action 230 may be used generate an outbound response 224. The message processing component 140 may use, or work in conjunction with, outbound component 216 in order to provide outbound response 224 to the user 202 via device 104. For example, after the user 202 has sent communication 218 via the device 104, and the action 230 has been determined, the action 230 may indicate a confirmation notification to be presented to the user 202 on the device 104. For example, if the communication 218 is a PDF of a recipe, the action 230 may indicate a confirmation notification of "the recipe has been added to your recipe library." The outbound response 224 may be presented to the user 202 through the same format by which the communication 218 was sent. For example, if the user 202 sent the communication 218 via email, the outbound response 224 may also be a confirmation email. As described in more detail below with respect to FIG. 5, the confirmation notification may include a request for user input, such as confirming the action 230.

Figure 3:
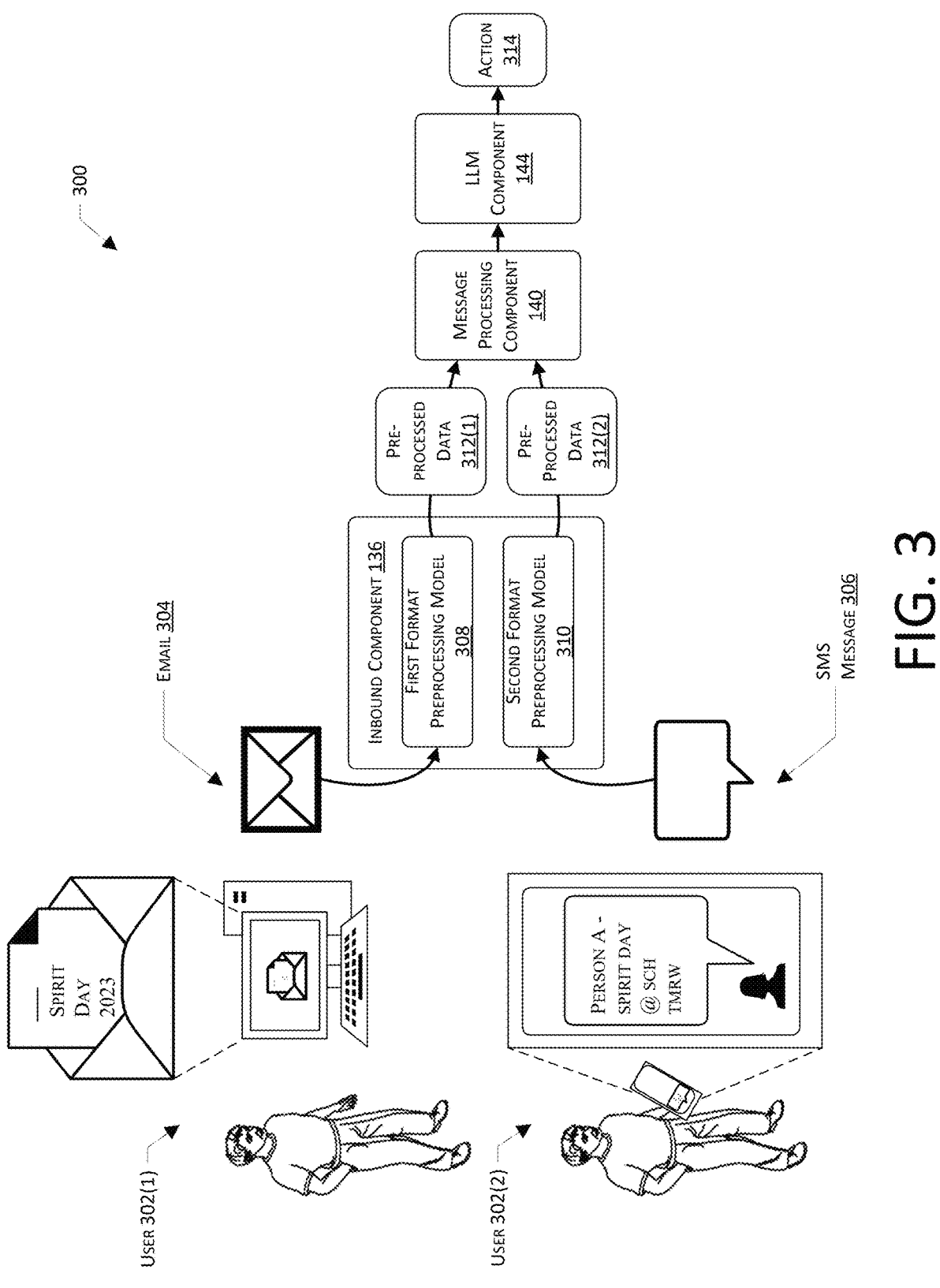
FIG. 3 illustrates a conceptual diagram for processing different formats of communication and determining an appropriate action.

FIG. 3 illustrates a conceptual diagram for processing different formats of communication and determining an appropriate action. As illustrated in environment 300, two different types of communications, such as email 304 and/or SMS message 306, may be received by the inbound component 136. For example, user 301(2) may send email 304 to a device and user 302(2) may send SMS message 306 via the device 104, where the device 104 is associated with inbound component 136. When email 304 data and/or SMS message 306 data is received by the inbound component 136, each format of communication may be processed by a different preprocessing model. For example, when email 304 data and/or SMS message 306 data is received by the inbound component 136, the inbound component 136 may identify the format of each communication. In this example, the inbound component 136 may include logic that enables the inbound component 136 to determine the format of each communication and identify the appropriate preprocessing models, such as first format preprocessing model 308 and/or second format preprocessing model 310. Based on the format determined by the inbound component 136, the inbound component 136 may be configured to cause the appropriate preprocessing model to be executed. Additionally, or alternatively, the preprocessing models, such as first format preprocessing model 308 and/or second format preprocessing model 310, may be configured to identify the format of each communication. In this example, email 304 data may be preprocessed by a first format preprocessing model 308, where the first format preprocessing model 308 is configured to preprocess communications in email format. Further, SMS message 306 data may be preprocessed by a second format preprocessing model 310, where the second format preprocessing model 310 is configured to preprocess communications in SMS message format.

The first format preprocessing model 308 and/or the second format preprocessing model 310 may also be configured to normalize the email 304 data and/or the SMS message 306 data, respectively. For example, the email 304 may include a PDF attachment entitled "Spirit Day 2023," when may include details about an upcoming spirit day event (e.g., "Elementary school spirit day is on Dec. 6 th, 2023.") Additionally, or alternatively, the content of the SMS message 306 may also include information about an upcoming spirit day event, but may include less details and/or different nomenclature (e.g., "Person A—spirit day @sch tmrw") than what is used in the PDF attachment. When email 304 data and/or SMS message 306 is received by the inbound component 136, the first format preprocessing model 308 and/or the second format preprocessing model 310 may normalize the data as preprocessed data 312(1) and/or preprocessed data 312(2). The text data 312 may include certain attributes of the email 304 data and/or the SMS message 306 data. In this way, the email 304 data and/or the SMS message 306 data is normalized so that it may be processed by the same message processing component 140 and/or LLM component 144 in determining an action 314.

Figure 4:
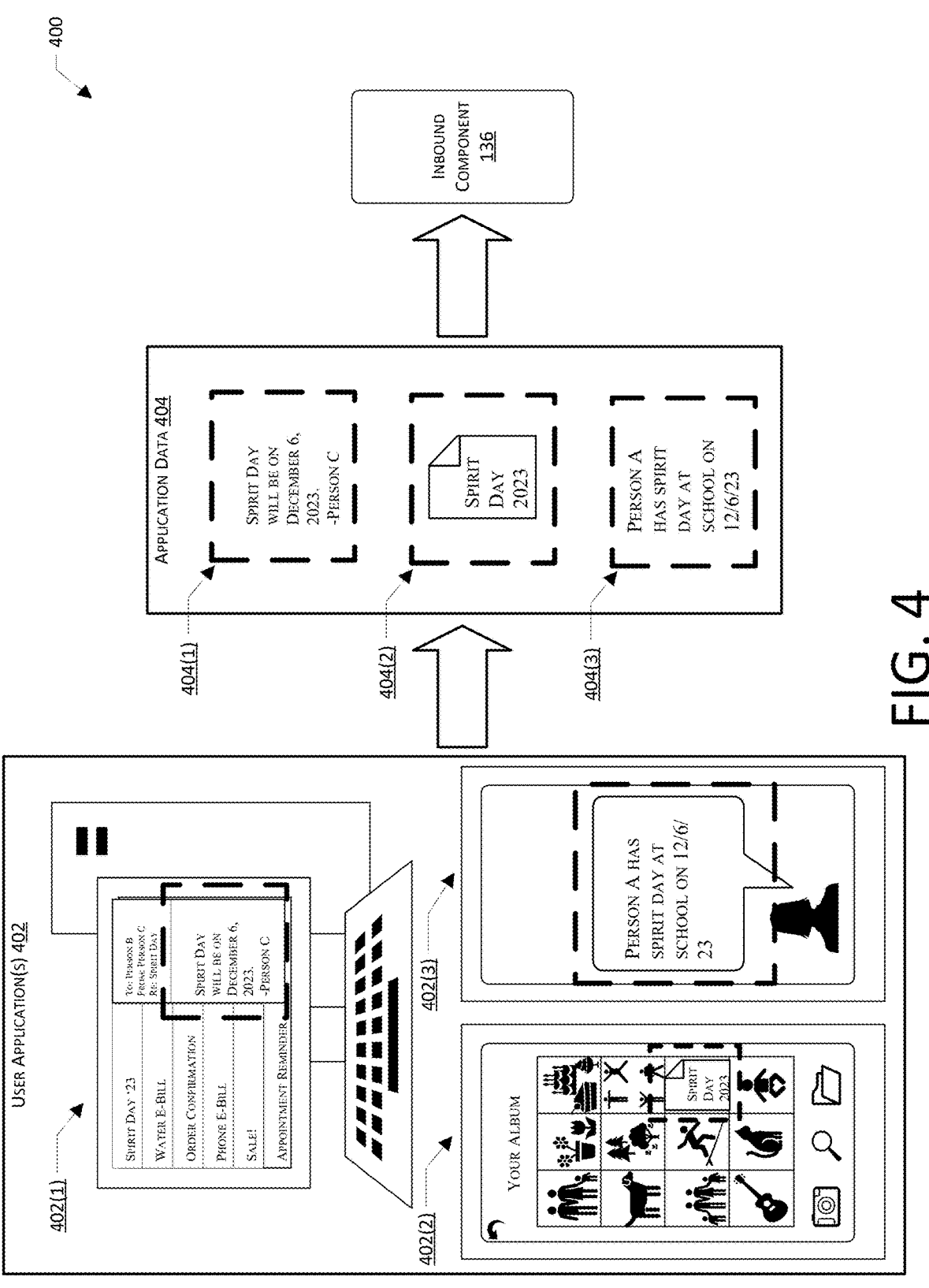
FIG. 4 illustrates a flow diagram of an example process for extracting application data from user devices.

FIG. 4 illustrates a flow diagram of an example process for extracting application data from user devices. As illustrated in environment 400, user applications 402 may be present on a device of a user. For example, user application 402(1) may include any type of email service provided by any provider (e.g., Google Gmail, Microsoft Outlook, Yahoo! Mail, etc.). Further, the user application 402(1) may be provided by a cloud-based email service platform (e.g., Google G Suite, Microsoft Office 365, etc.). A communication processing system, such as document processing system 134, may use and/or work in conjunction with the third-party email service providers in order to extract data from the application 402(1). For example, user application 402(1) may include an email with information for an upcoming spirit day. The types of data that may be extracted from the application 402(1) may include indications of the "Subject" of an email, attachments, content from the body of the email, etc. For example, the application data 404(1) includes the content from the body of the email.

In another example, user application 402(2) may include a personal file cabinet of a user, a photo storage application, and the like. User application 402(2) may include any type of storage service provided by any provider, and/or may be provided by a cloud-based storage platform. The communication processing system, such as document processing system 134, may use and/or work in conjunction with the third-party storage service providers in order to extract data from the application 402(2). For example, user application 402(2) may include a screen shot of a PDF with information on an upcoming spirit day. In this example, the application data 404(2) includes the content of the screenshot.

In another example, user application 402(3) may include any type of messaging service provided by any provider, and/or may be provided by a cloud-based messaging service platform. The communication processing system, such as document processing system 134, may use and/or work in conjunction with the third-party messaging service providers in order to extract data from the application 402(3). For example, user application 402(3) may include an SMS message with information on an upcoming spirit day. In this example, the application data 404(3) may include the contents of the SMS message.

After application data 404 has been extracted from user applications 402, the application data 404 may be received by the inbound component 136 of a communication processing system. In this way, a user is not required to actively send communications to the communication processing system. The user may also define what information is permitted to be extracted from the applications 402 (e.g., not allowing personal addresses to be extracted from the applications 402). Additionally, or alternatively, the user may also define what applications 402 may be extracted from (e.g., allowing information to be extracted from applications 402(1) and 402(3), but not 402(2).)

Figure 5:
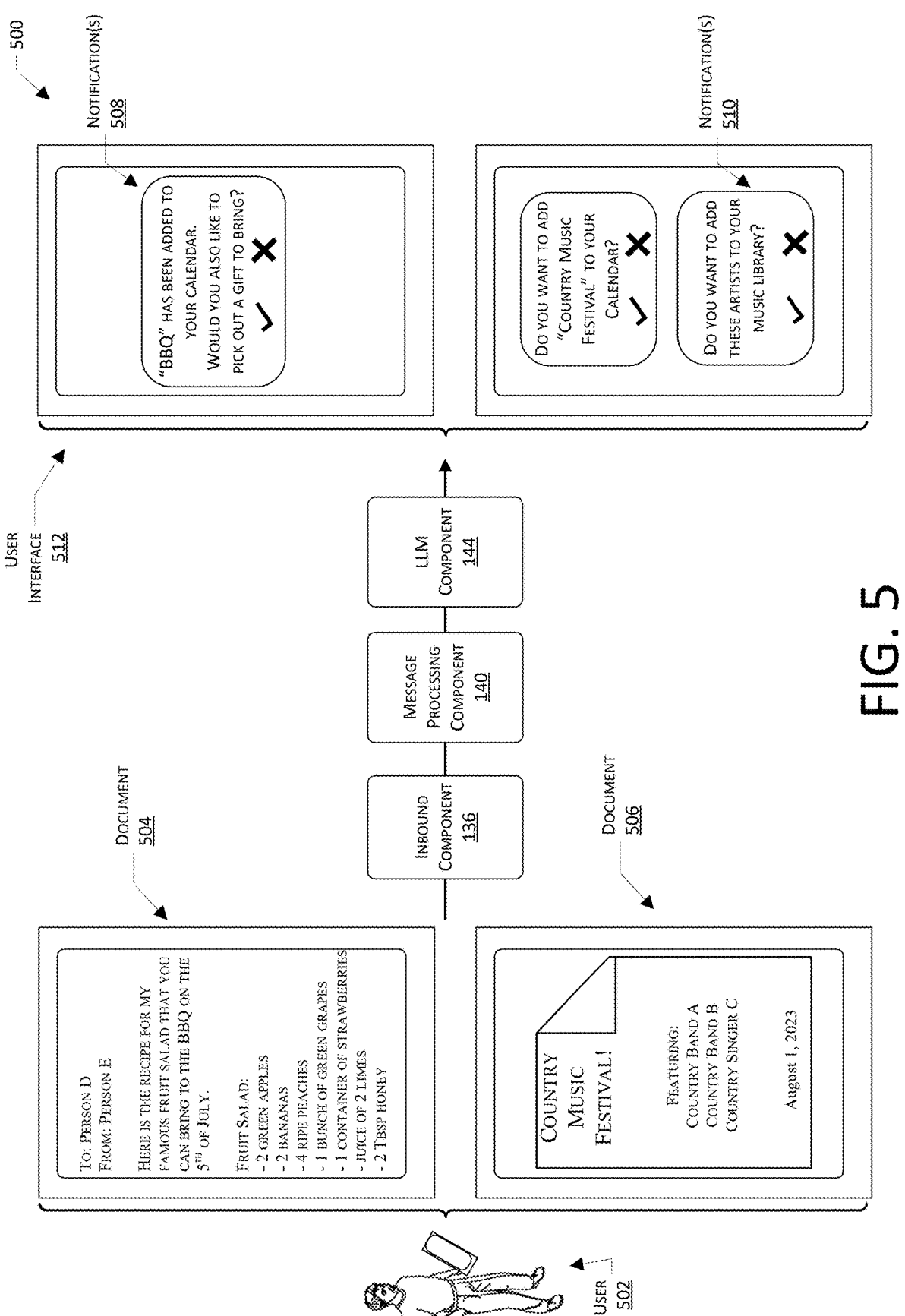
FIG. 5 illustrates an example user interface for user input when a document may contain more than one appropriate action.

FIG. 5 illustrates an example user interface for user input when a document may contain more than one appropriate action. As illustrated in environment 500, a user 502 may send a document, such as document 504 and/or document 506, to a system, where the document data is preprocessed and processed downstream by the inbound component 136, message processing component 140, and LLM component 144. As described above with respect to FIGS. 1 and 2, the LLM component 144 may determine an action that is appropriate for documents such as document 504 and/or 506. For example, document 504 and/or document 506 may be an image and may contain information such as a recipe, music information, a date, etc. After the image data is received by the inbound component 136, the image data may be processed to indicate any text identified in the image data (e.g., text of the recipe, music information, the date, etc.) Additionally, or alternatively, the image data may be processed to indicate a textual representation of objects in the image data, identification of links, identifiers of people associated with the image data, and the like. In this example, the image data may further be processed to a prompt, where the prompt may be used by the LLM component 144 in determining an appropriate action.

When a communication, such as document 504 and/or 506, includes a combination of recipes, dates, music, photos, etc. that may be relevant to the user 502, the action may indicate an appropriate response for each recipe, date, music, photo, etc. provided by the user 502. In this example, the action may be used to generate content data. The content data may represent confirmation content, such as notification 508 and/or 510, that is to be presented to the user 502. Notification 508 and/or notification 510 may be presented to the user 502 via a user interface 512.

When the action determined by the LLM component may include multiple applications and/or domains, the user 502 may be presented with notifications that request user input. For example, notifications 508 and 510 may include selectable user interface components that enable the user 502 to select actions they wish to be executed. In this example, for document 504, the action determined to be appropriate by the LLM component 144 may include an API call(s) to shopping, recipe, and calendar applications and/or domains. The notifications 508 may include confirmations, such as a confirmation that a date has been added to a calendar, and/or may also include confirmations for subsequent actions (e.g., "would you also like to pick out a gift to bring?" Additionally, or alternatively, for document 506, the action determined to be appropriate by the LLM component 144 may include API call(s) to music and calendar applications and/or domains. The notifications 510 may include confirmations whether the user 502 would like to add the date of the festival to a calendar and/or add the artists of the festival lineup to a music library. Based on the input of the user 502 selecting actions in response to the notifications 508 and/or 510, the selected actions may be executed. In some examples, even if the documents 504 and 506 may contain multiple actions, the actions may be performed automatically without the need for confirmation by the user 502.

FIGS. 6 and 7 illustrate processes associated with multi-channel AI architectures. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5 and 8-13, although the processes may be implemented in a wide variety of other environments, architectures and systems.

FIG. 6 illustrates a flow diagram of an example process associated with multi-channel AI architectures. The order in which the operations or steps are described is not intended to be construed as a limitation, and any number of the described operations may be combined in any order and/or in parallel to implement process 600.

At block 602, the process 600 may include receiving first data representing a communication that was received at a first user device. In this example, a system may be configured to receive a communication, such as a document, from a user and to generate an appropriate action associated with the communication. The user may communicate with the system by sharing a document via a device. The communication may also be an email, image, PDF, SMS message, input at a website, voice utterance, and the like. The document may also be included in the communication as an attachment, URL link, and the like.

Additionally, or alternatively, when the communication is a voice utterance of the user, audio processing may be used. For example, the audio processing may include the use of automatic speech recognition (ASR) processes and/or natural language understanding (NLU) processes. In such examples, the user may not send a document or other types of communication such as emails, images, PDFs, SMS messages, website input, etc. Instead, the user may communicate via the device as a voice-enabled device that is configured to detect speech utterances. The device as a voice enabled device may detect a speech utterance of a user. The speech utterance may include a request such as "remind me I have an appointment tomorrow." The voice-enabled device may then send the audio signal to be processed by the ASR and/or NLU.

At block 604, the process 600 may include associating the communication with a user account, wherein the user account is associated with the first user device. A user registry may be configured to determine and/or generate associations between users, user accounts, environment identifiers, and/or devices. For example, one or more associations between user accounts may be identified, determined, and/or generated by the user registry. The user registry may additionally store information indicating one or more applications and/or resources accessible to and/or enabled for a given user account. Additionally, the user registry may include information indicating device identifiers, such as naming identifiers, associated with a given user account, as well as device types associated with the device identifiers. The user registry may also include information indicating user account identifiers, naming indicators of devices associated with user accounts, and/or associations between devices, such as the smart devices. The user registry may also include information associated with usage of the smart devices. Data associated with the user accounts may include, for example, account access information, historical usage data, device-association data, and/or preference data.

At block 606, the process 600 may include determining a first format associated with the communication, wherein the first format is one of multiple communication formats that the first user device is configured to receive. In this example, when the user has sent a document, the document data may be sent to components of the document processing system for preprocessing, such as an inbound component. The document processing system may be configured to preprocess the document data received and/or extracted from the user. Document data may be input into the inbound component, and normalized text data representing the communication is the output. In some examples, the preprocessing of the document data may be specific to the format of the communication. For example, one preprocessing model may be used to preprocess document data for communications in document format. In this example, the document processing system may identify the format of the document and/or the means by which the document was sent.

At block 608, the process 600 may include generating, using the first data and a first preprocessing model configured to process data associated with the first format, preprocessed data representing the communication, wherein the first preprocessing model is selected from multiple preprocessing models, the multiple preprocessing models configured to preprocess communications in the multiple communication formats. For example, once the format of the document is identified, the document processing system may use the corresponding preprocessing model in order to normalize the document data. In this example, document data is normalized so that it may be processed downstream by a single message processing component of the document processing system. The inbound component may normalize the document data and output preprocessed data, where the preprocessed data includes certain attributes of the document data.

At block 610, the process 600 may include sending, to a message processing layer, the preprocessed data representing the communication, wherein a first portion of the preprocessed data is identified from the preprocessed data. In this example, after document data has been normalized as preprocessed data, the message processing component may receive the preprocessed data from the inbound component. Upon receiving the preprocessed data, the message processing component may extract a preprocessed t data portion that represents the contents of PDFs, images, URLs, etc. that may be included with the document. The preprocessed data portion may be metadata associated with the document. Additionally, or alternatively, the message processing component may extract a portion of the preprocessed data that represents the content of the document itself At block 612, the process 600 may include determining, using a large language model (LLM) associated with the message processing layer and based at least in part on the first portion of the preprocessed data, a first action associated with the communication. In this example, the message processing component may be associated with and/or include LLM or otherwise is configured to generate content and/or responses based on inputs such as prompts. In this example, the LLM may intake a prompt associated with the preprocessed data portion and may determine an action based at least in part on the preprocessed data portion received from the message processing component and how the LLM is trained to respond to the document 102 of the user. Using the prompt and preprocessed data portion representing the document, the LLM may output an action.

At block 614, the process 600 may include selecting an application programming interface (API) to send a request to for executing the first action. For example, the action may be used to generate and cause the execution of a request (e.g., an API call(s)). The action may indicate an API call to an application, which may be executed when the user later makes a request. For example, the document sent via the device by the user may include a birthday party invitation. Based on the data portion, the action may indicate an API call to a calendar application, which may be executed when the user later requests information on the birthday party.

At block 616, the process 600 may include receiving, from a second user device associated with the user account, a request for information, wherein the information is at least partially included in the communication. For example, vector data may be used to generate response data in order to respond to user commands (e.g., requests, questions, etc.). For example, the user command may be a voice command to device 104, where the user requests the device 104 to provide certain information.

At block 618, the process 600 may include, based at least in part on the communication being associated with the user account, causing the information to be output at the second user device. For example, the document processing system 134 may generate a vector representation of the user command, and compare the vector representation of the user command to vector data 130 to determine an appropriate response to the user. Additionally, or alternatively, the process 600 may include receiving second data representing a SMS message, determining a second format associated with the SMS message, and generating, using the second data and a second preprocessing model configured to process data associated with the second format, preprocessed data representing the SMS message, wherein the second preprocessing model is selected from the multiple preprocessing models. Further, the process 600 may include sending, to the message processing layer, the preprocessed data representing the SMS message, wherein a second portion of the preprocessed data is identified from the preprocessed data, and sending, to the LLM, the second portion of the preprocessed data and a set of instructions for processing the second portion of the preprocessed data. The process 600 may include determining, using the LLM and based at least in part on the second portion of preprocessed data and the set of instructions, a second action that is responsive to the SMS message, and selecting the API to send a request to for executing the second action.

Additionally, or alternatively, the process 600 may include generating, based at least in part on the first action determined by the LLM, content data configured to be used by the first user device to output content corresponding to the content data, wherein the content includes at least a confirmation of the first action. The process 600 may also include sending the content data to the first user device, the content data causing an application on the user device to enable and display the content and an indication that the content is associated with the communication.

Additionally, or alternatively, the process 600 may include generating a first vector representation of the first data, wherein the first vector representation is stored and associated with the user account, receiving user input data at least partially associated with the communication, wherein the first vector representation is stored and associated with the user account, and receiving user input data at least partially associated with the communication. The process 600 may also include generating a second vector representation of the user input data. The process 600 may also include determining a similarity value indicating a similarity between the first vector representation and the second vector representation, and based at least in part on the similarity value, generating a response to the user input data utilizing the communication.

FIG. 7 illustrates a flow diagram of another example process associated with multi-channel AI architectures. The order in which the operations or steps are described is not intended to be construed as a limitation, and any number of the described operations may be combined in any order and/or in parallel to implement process 700

At block 702, the process 700 may include receiving first data representing a document that was sent from a user at a first user device with a request to process the document. In this example, a system may be configured to receive a communication, such as a document, from a user and to generate an appropriate action associated with the communication data. The user may communicate with via a device by sharing a document. The communication may also be an email, image, PDF, SMS message, input at a website, voice utterance, and the like. The document may also be included in the communication as an attachment, URL link, and the like.

Additionally, or alternatively, when the communication is a voice utterance of the user, audio processing may be used. For example, the audio processing may include the use of automatic speech recognition (ASR) processes and/or natural language understanding (NLU) processes. In such examples, the user may not send a document or other types of communication such as emails, images, PDFs, SMS messages, website input, etc. Instead, the user may communicate via the device as a voice-enabled device that is configured to detect speech utterances. The device as a voice enabled device may detect a speech utterance of a user. The speech utterance may include a request such as "remind me I have an appointment tomorrow." The voice-enabled device may then send the audio signal to be processed by the ASR and/or NLU.

At block 704, the process 700 may include associating the document with a user account. A user registry may be configured to determine and/or generate associations between users, user accounts, environment identifiers, and/ or devices. For example, one or more associations between user accounts may be identified, determined, and/or generated by the user registry. The user registry may additionally store information indicating one or more applications and/or resources accessible to and/or enabled for a given user account. Additionally, the user registry may include information indicating device identifiers, such as naming identifiers, associated with a given user account, as well as device types associated with the device identifiers. The user registry may also include information indicating user account identifiers, naming indicators of devices associated with user accounts, and/or associations between devices, such as the smart devices. The user registry may also include information associated with usage of the smart devices. Data associated with the user accounts may include, for example, account access information, historical usage data, device-association data, and/or preference data.

At block 706, the process 700 may include determining a first format associated with the document, wherein the first format is one of multiple document formats. In this example, when the user has sent a document, the document data may be sent to components of the document processing system for preprocessing, such as an inbound component. The document processing system may be configured to preprocess the document data received and/or extracted from the user. Document data may be input into the inbound component, and normalized preprocessed data representing the communication is the output. In some examples, the preprocessing of the document data may be specific to the format of the communication. For example, one preprocessing model may be used to preprocess document data for communications in document format. In this example, the document processing system may identify the format of the document and/or the means by which the document was sent.

At block 708, the process 700 may include generating, using the first data and a first model configured to process data associated with the first format, preprocessed data representing the document. For example, once the format of the document is identified, the document processing system may use the corresponding preprocessing model in order to normalize the document data. In this example, document data is normalized so that it may be processed downstream by a single message processing component of the document processing system. The inbound component may normalize the document data and output preprocessed data, where the preprocessed data includes certain attributes of the document data.

At block 710, the process 700 may include identifying a first portion of the preprocessed data from the preprocessed data. In this example, after document data has been normalized as preprocessed data, the message processing component may receive the preprocessed data from the inbound component. Upon receiving the preprocessed data, the message processing component may extract preprocessed data portion that represents the contents of PDFs, images, URLs, etc. that may be included with the document. The preprocessed data portion may be metadata associated with the document. Additionally, or alternatively, the message processing component may extract a portion of the preprocessed data that represents the content of the document itself.

At block 712, the process 700 may include determining, using a second model and based at least in part on the first portion of the preprocessed data, a first action associated with the document. In this example, the message processing component may be associated with and/or include LLM or otherwise is configured to generate content and/or responses based on inputs such as prompts. In this example, the LLM may intake a prompt associated with the preprocessed data portion and may determine an action based at least in part on the preprocessed data portion received from the message processing component and how the LLM is trained to respond to the document 102 of the user. Using the prompt and preprocessed data portion representing the document, the LLM may output an action.

At block 714, the process 700 may include selecting an application programming interface (API) to send a request to for executing the first action. the process 600 may include selecting an application programming interface (API) to send a request to for executing the first action. For example, the action may be used to generate and cause the execution of a request (e.g., an API call(s)). The action may indicate an API call to an application, which may be executed when the user later makes a request. For example, the document sent via the device by the user may include a birthday party invitation. Based on the data portion, the action may indicate an API call to a calendar application, which may be executed when the user later requests information on the birthday party.

At block 716, the process 700 may include receiving, from a second user device, a request for information, wherein the information is at least partially included in the document. For example, vector data may be used to generate response data in order to respond to user commands (e.g., requests, questions, etc.). For example, the user command may be a voice command to device 104, where the user requests the device 104 to provide certain information.

At block 718, the process 700 may include, based at least in part on the document being associated with the user account, causing the information to be output at the second user device. For example, the document processing system 134 may generate a vector representation of the user command, and compare the vector representation of the user command to vector data 130 to determine an appropriate response to the user.

Additionally, or alternatively, the process 700 may include receiving second data representing a SMS message, determining a second format associated with the SMS message, and generating, using the second data and a third model configured to process data associated with the second format, preprocessed data representing the SMS message. The process 700 may also include identifying a second portion of the preprocessed data from the preprocessed data, and sending, to the second model, the second portion of the processed data and a set of instructions for processing the second portion of the preprocessed data. The process 700 may also include determining, using the second model and based at least in part on the second portion of the preprocessed data and the set of instructions, a second action associated with the SMS message, and selecting the API to send a request to for executing the second action.

Additionally, or alternatively, the process 700 may include generating, based at least in part on the action determined by the second model, content data configured to be used by the first user device to output content corresponding to the content data, wherein the content includes at least a confirmation of the first action. The process 700 may also include sending the content data to the first user device, the content data causing an application on the first user device to enable and display the content and an indication that the content is associated with the document.

Additionally, or alternatively, the process 700 may include generating a first representation of the first data, wherein the first representation is stored and associated with the user input, receiving user input data, generating a second representation of the user input data, and determining a similarity value indicating a similarity between the first representation and the second representation. The process 700 may also include based at least in part on the similarity value, generating a response to the user input data.

Additionally, or alternatively, the process 700 may include generating, using the first data representing the document, preference data representing a user preference, generating a first representation of the preference data, and receiving user input data, where in the user input data is associated with an input at a user device. The process 700 may also include generating a second representation of the user input data, determining a similarity value indicating a similarity between the first representation and the second representation, and determining, based at least in part on the similarity value, an action that is responsive to the input at the user device.

Additionally, or alternatively, the process 700 may include identifying a user account associated with the first user device, determining identifying information associated with the document, and determining, from the identifying information, that the document is associated with the user account. The process 700 may also include causing the action to be performed based at least in part on the document being associated with the user account.

Additionally, or alternatively, the process 700 may include determining that the first user device is utilizing an application predefined for extracting communications, wherein the application is linked to the user account and differs from the first model and the second model. The process 700 may also include determining that the application is being utilized, and based at least in part on determining that the application is being utilized, querying for the document as displayed utilizing the application, and extracting the first data from the application without user input.

Additionally, or alternatively, the process 700 may include generating a notification indicating the action determined by the second model, and causing display of the notification in a foreground of the first user device, wherein the notification includes a selectable portion that, when selected, causes the action to be performed.

Figure 8:
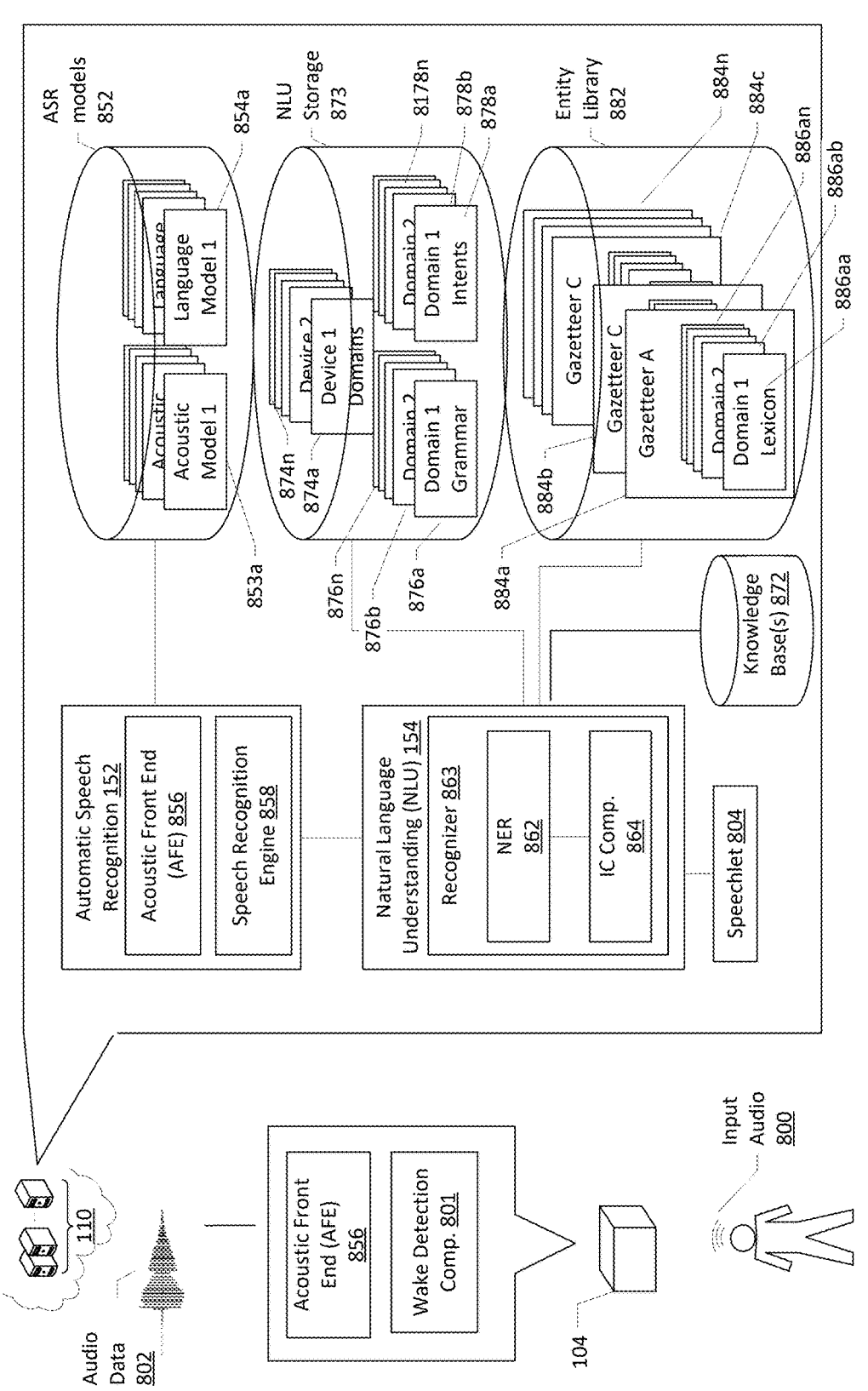
FIG. 8 illustrates a conceptual diagram of components of a speech-processing system for processing audio data provided by one or more devices.

FIG. 8 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 8 may occur directly or across a network 106. An audio capture component, such as a microphone 114 of the device(s) 104, or another device, captures audio 800 corresponding to a spoken utterance. The device(s) 104, using a wake word engine 801, then processes audio data corresponding to the audio 800 to determine if a keyword (such as a wakeword) is detected in the audio data. Following detection of a wakeword, the device(s) 104 processes audio data 802 corresponding to the utterance utilizing an ASR component 152. The audio data 802 may be output from an optional acoustic front end (AFE) 856 located on the device prior to transmission. In other instances, the audio data 802 may be in a different form for processing by a remote AFE 856, such as the AFE 856 located with the ASR component 152.

The wake word engine 801 works in conjunction with other components of the user device, for example a microphone to detect keywords in audio 800. For example, the device may convert audio 800 into audio data, and process the audio data with the wake word engine 801 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word engine 801 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 801 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/RNN structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device(s) 104 may "wake." The audio data 802 may include data corresponding to the wakeword. Further, a local device may "wake" upon detection of speech/spoken audio above a threshold, as described herein. An ASR component 152 may convert the audio data 802 into text. The ASR transcribes audio data into text data or other ASR output data representing the words of the speech contained in the audio data 802. The text data or other ASR output data may then be used by other components for various purposes, such as executing system commands, inputting data, etc. A spoken utterance in the audio data is input to a processor configured to perform ASR which then interprets the utterance based on the similarity between the utterance and pre-established language models 854 stored in an ASR model knowledge base (ASR Models Storage 852). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 853 stored in an ASR Models Storage 852), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 856 and a speech recognition engine 858. The acoustic front end (AFE) 856 transforms the audio data from the microphone into data for processing by the speech recognition engine 858. The speech recognition engine 858 compares the speech recognition data with acoustic models 853, language models 854, and other data models and information for recognizing the speech conveyed in the audio data. The AFE 856 may reduce noise in the audio data and divide the digitized audio data into frames representing time intervals for which the AFE 856 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 858 may process the output from the AFE 856 with reference to information stored in speech/model storage (852). Alternatively, post front-end processed data (such as feature vectors) may be received by the device executing ASR processing from another source besides the internal AFE. For example, the user device may process audio data into feature vectors (for example using an on-device AFE 856).

The speech recognition engine 858 attempts to match received feature vectors to language phonemes and words as known in the stored acoustic models 853 and language models 854. The speech recognition engine 858 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, what time is the pool open until" The wake detection component may identify the wake word, otherwise described as a trigger expression, "Alexa," in the user utterance and may "wake" based on identifying the wake word. The speech recognition engine 858 may identify, determine, and/or generate text data or other ASR output data corresponding to the user utterance, here "what time is the pool open until."

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 858 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 154 may include various components, including potentially dedicated processor(s), memory, storage, etc. As shown in FIG. 8, an NLU component 154 may include a recognizer 863 that includes a named entity recognition (NER) component 862 which is used to identify portions of query text that correspond to a named entity that may be recognizable by the system. A downstream process called named entity resolution links a text portion to a specific entity known to the system. To perform named entity resolution, the system may utilize gazetteer information (884a-884n) stored in entity library storage 882. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 152 based on the utterance input audio 800) and attempts to make a semantic interpretation of the text. That is, the NLU process determines the meaning behind the text based on the individual words and then implements that meaning. NLU processing 154 interprets a text string to derive an intent or a desired action from the user as well as the pertinent pieces of information in the text that allow a device (e.g., device(s) 104) to complete that action. For example, if a spoken utterance is processed using ASR 152 and outputs the text "what time is the pool open until" the NLU process may determine that the user intended to receive a response to the voice command indicating a time when the pool of the enterprise entity closes.

The NLU 154 may process several textual inputs related to the same utterance. For example, if the ASR 152 outputs N text segments (as part of an N-best list), the NLU may process all N outputs to obtain NLU results.

As will be discussed further below, the NLU process may be configured to parse and tag to annotate text as part of NLU processing. For example, for the text "what time is the pool open until," "what time" may be tagged as a command (to determine a time to respond to the user with).

To correctly perform NLU processing of speech input, an NLU process 154 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 862 receives a query in the form of ASR results and attempts to identify relevant grammars and lexical information that may be used to construe meaning. To do so, the NLU component 154 may begin by identifying potential domains that may relate to the received query. The NLU storage 873 includes a database of devices (874a-874n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 863, language model and/or grammar database (876a-876n), a particular set of intents/actions (878a-878n), and a particular personalized lexicon (886). Each gazetteer (884a-884n) may include domain-indexed lexical information associated with a particular user and/or device. For example, the Gazetteer A (884a) includes domain-index lexical information 886aa to 886an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 864 parses the query to determine an intent or intents for each identified domain, where the intent corresponds to the action to be performed that is responsive to the query. Each domain is associated with a database (878a-878n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 864 identifies potential intents for each identified domain by comparing words in the query to the words and phrases in the intents database 878. In some instances, the determination of an intent by the IC component 864 is performed using a set of rules or templates that are processed against the incoming text to identify a matching intent.

In order to generate a particular interpreted response, the NER 862 applies the grammar models and lexical information associated with the respective domain to actually recognize a mention of one or more entities in the text of the query. In this manner, the NER 862 identifies "slots" or values (i.e., particular words in query text) that may be needed for later command processing. Depending on the complexity of the NER 862, it may also label each slot with a type of varying levels of specificity (such as noun, place, device name, device location, city, artist name, song name, amount of time, timer number, or the like). Each grammar model 876 includes the names of entities (i.e., nouns) commonly found in speech about the particular domain (i.e., generic terms), whereas the lexical information 886 from the gazetteer 884 is personalized to the user(s) and/or the device. For instance, a grammar model associated with the shopping domain may include a database of words commonly used when people discuss shopping.

The intents identified by the IC component 864 are linked to domain-specific grammar frameworks (included in 876) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (876) framework or frameworks may correspond to sentence structures such as "purchase item called 'Item A' from Marketplace A."

For example, the NER component 862 may parse the query to identify words as subject, object, verb, preposition, etc., based on grammar rules and/or models, prior to recognizing named entities. The identified verb may be used by the IC component 864 to identify intent, which is then used by the NER component 862 to identify frameworks. A framework for the intent of "play a song," meanwhile, may specify a list of slots/fields applicable to play the identified "song" and any object modifier (e.g., specifying a music collection from which the song should be accessed) or the like. The NER component 862 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 862 may search the database of generic words associated with the domain (in the knowledge base 872). So, for instance, if the query was "identify this song," after failing to determine which song is currently being output, the NER component 862 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 890. The speechlet 890 may be determined based on the NLU output. For example, if the NLU output includes a command to send a message, the destination speechlet 890 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the destination speechlet 890 may provide some or all of this information to a text-to-speech (TTS) engine. The TTS engine may then generate an actual audio file for outputting the audio data determined by the application (e.g., "okay," or "the pool closes at 10:00 pm").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 154 during runtime operations where NLU operations are performed on text (such as text output from an ASR component 152). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 863. Each recognizer may include various NLU components such as an NER component 862, IC component 864 and other components such as an entity resolver, or other components.

For example, a messaging domain recognizer 863-A (Domain A) may have an NER component 862-A that identifies what slots (i.e., portions of input text) may correspond to particular words relevant to that domain. The words may correspond to entities such as (for the messaging domain) a recipient. An NER component 862 may use a machine learning model, such as a domain specific conditional random field (CRF) to both identify the portions corresponding to an entity as well as identify what type of entity corresponds to the text portion. The messaging domain recognizer 863-A may also have its own intent classification (IC) component 864-A that determines the intent of the text assuming that the text is within the proscribed domain. An IC component may use a model, such as a domain specific maximum entropy classifier to identify the intent of the text, where the intent is the action the user desires the system to perform. For this purpose, device(s) 104 may include a model training component. The model training component may be used to train the classifier(s)/ machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 110, as illustrated herein are exemplary, and may be located in a stand-alone device or may be included, in whole or in part, as a component of a larger device or system, may be distributed across a network or multiple devices connected by a network, etc.

Figure 9:
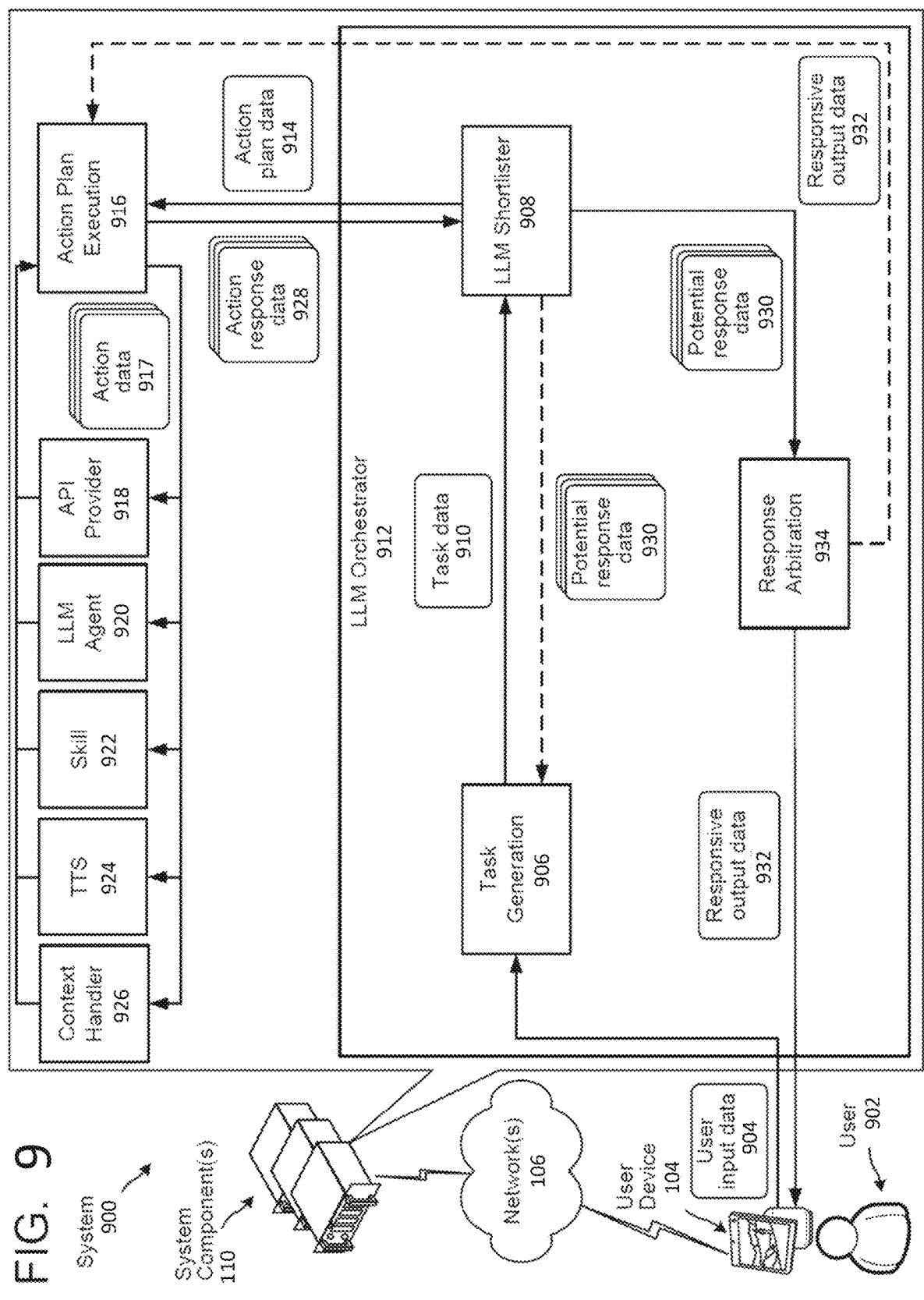
FIG. 9 is a conceptual diagram illustrating example components and processing of a system configured to determine a response to a user input, according to embodiments of the present disclosure.

FIG. 9 illustrates further example components included in the system 900 configured to determine an action responsive to a user input and in which the context handler component 926 may be implemented. As shown in FIG. 9, the system may include a user device(s) 104, local to a user 902, in communication with a system component(s) 110 via a networks(s) 106. The networks(s) 106 may include the Internet and/or any other wide- or local-area network, and may include wired, wireless, and/or cellular network hardware.

The system component(s) 110 may include various components, such as a large language model (LLM) orchestrator component 912, and an action plan execution component 916. The LLM orchestrator component 912 may include a task generation component 906, an LLM shortlister component 908, and a response arbitration component 934.

In some embodiments, the LLM orchestrator component 912 may generate prompt data representing a prompt for input to one or more language models. As shown in FIG. 9, the system component(s) 110 receive the user input data 904, which may be provided to the LLM orchestrator component 912. In some instances, the user input data 904 may correspond to various data types, such as text (e.g., a text or tokenized representation of a user input), audio, image, video, etc. For example, the user input data may include input text (or tokenized) data when the user input is a typed natural language user input. For further example, prior to the LLM orchestrator component 912 receiving the user input data 904, another component (e.g., an automatic speech recognition (ASR) component 152) of the system 900 may receive audio data representing the user input. The ASR component 152 may perform ASR processing on the audio data to determine ASR data corresponding to the user input, which may correspond to a transcript of the user input. As described below, with respect to FIG. 13, the ASR component 152 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 144 level of confidence that the corresponding hypothesis represents what the user said. The ASR component 152 may also determine token scores corresponding to each token/word of the ASR hypothesis, where the token score indicates the ASR component's 144 level of confidence that the respective token/ word was spoken by the user. The token scores may be identified as an entity score when the corresponding token relates to an entity. In some instances, the user input data 904 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 900 may include one or more components configured to process such user inputs to generate the text or tokenized representation of the user input (e.g., the user input data 904).

In some embodiments, the LLM orchestrator component 912 may receive input data, which may be processed in a similar manner as the user input data 904 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the device(s) 104, a user entering the home, etc.). In some embodiments, the system 900 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 900 may include one or more components configured to process the input data to generate a natural language representation of the input data. The system 900 may process the input data and may perform an action. For example, in response to detecting a garage door opening, the system 900 may cause garage lights to turn on, living room lights to turn on, etc. As another example, in response to detecting an oven beeping, the system 900 may cause a device(s) 104 (e.g., a smartphone, a smart speaker, etc.) to present an alert to the user. The LLM orchestrator component 912 may process the input data to generate tasks that may cause the foregoing example actions to be performed.

In some embodiments, the LLM orchestrator component 912 may generate prompt data representing a prompt for input to the language models. As shown in FIG. 9, the user input data 904 may be received at the task generation component 906 of the LLM orchestrator component 912, which may be configured to generate a list (e.g., one or more) of tasks (e.g., steps/actions) that are to be completed in order to perform an action responsive to the user input and select a task of the list of the tasks that is to be completed first (e.g., in a current iteration of processing by the system 900), as described in detail herein below with respect to FIG. 10. For example, for a user input of "What is the weather for today," the task generation component 906 may generate a list of tasks of "(1) determine current outside temperature from thermostat; and (2) determine weather forecast for today" and select the task of "determine weather forecast for today" to be completed first. For further example, for a user input of "I am back, please continue outputting the recipe instructions," the task generation component 906 may generate a list of tasks of "(1) determine context for outputting the recipe instructions; and (2) resume output of the recipe instructions" and select the task of "determine context for outputting the recipe instructions" to be completed first.

In instances where the task generation component 906 generates more than one task to be completed in order to perform the action responsive to the user input, the task generation component 906 may further maintain and prioritize the list of tasks as the processing of the system 900 with respect to the user input is performed. In other words, as the system 900 processes to complete the list of tasks, the task generation component 906 may (1) incorporate the potential responses associated with completed tasks into data provided to other components of the system 900; (2) update the list of tasks to indicate completed (or attempted, in-progress, etc.) tasks; (3) generate an updated prioritization of the tasks remaining to be completed (or tasks to be attempted again); and/or (4) determine an updated current task to be completed. The task generation component 906 may generate and send task data 910 representing the selected task to be completed and various other information needed to perform further processing with respect to the task (e.g., the user input data 904, an indication of the selected task, potential responses associated with previous tasks, the remaining task(s), and context data associated with the user input data 904, as described in detail herein below with respect to FIG. 10) to the LLM shortlister component 908.

The LLM shortlister component 908 may be configured to determine one or more components (e.g., an API provider component 918, skill component(s) 922, LLM agent component(s) 920, a TTS component 924, the context handler component 926, etc.) configured to perform an action related to the user input or the current task. The LLM shortlister component 908 may further be configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task). For example, for a current task of "determine weather forecast for today," the LLM shortlister component 908 may generate requests of "determine user's preferred weather application," "use Weather Application A to determine weather forecast for today," "use Weather Application B to determine weather forecast for today," or the like. Such requests may be represented in the action plan data 914 sent to the action plan execution component 916. The action plan execution component 916 may identify the request(s) in the action plan data 914, generate executable API calls corresponding to the request(s), and cause the corresponding components (e.g., the API provider component 918, the LLM agent component 920, the skill component 922, the TTS component 924, and/or the context handler component 926) to generate action response data 928 representing the requested potential response(s), where individual action response data 928 may be provided by/correspond to a particular component—one of the API provider component 918, the LLM agent component 920, the skill component 922, the TTS component 924, and/or the context handler component 926. In some embodiments, the action response data 928 may include an identifier (e.g., a component name, an alphanumerical value associated with the component, etc.) for the component providing the data. The LLM shortlister component 908 receives and processes the action response data 928 and generates potential response data 930 representing the potential response(s) (e.g., relevant potential responses, selected potential responses, ranked potential responses, etc.) for further processing. If the LLM shortlister component 908 determines that there are no remaining tasks to generate potential responses for, the LLM shortlister component 908 may send the potential response data 930 to the response arbitration component 934.

The potential response data 930, in some embodiments, may be determined based on receiving potential responses from various different components that may be relevant in responding to the user input data 904. For example, the potential response data 930 may include a first potential response from a first component configured to perform a first task determined by the task generation component 906, a second potential response from a second component configured to perform a second task determined by the task generation component 906, etc. The potential response data 930 can include more than one potential response relating to an individual task. In some embodiments, the potential response data 930 may be natural language data.

The response arbitration component 934 processes the potential response data 930 to determine whether the potential responses generated for the one or more tasks are responsive to the user input. The response arbitration component 934 processes the potential response data 930 (representing at least the generated potential responses) and selects one or more of the potential responses that are determined to be responsive to the user input and/or determines that none of the actions are responsive to the user input. For example, the response arbitration component 934 may process the potential response data 930 to determine if one or more of the potential responses performable by the API(s) (e.g., the potential responses and/or potential actions) are responsive to the current task. In some embodiments, the response arbitration component 934 may generate a natural language summary of one or more of the selected responses and output the natural language summary. For example, for a user input of "what is the weather for today" and potential responses of "The weather for today is a high of 75 and a low of 68" and "The weather for today is mostly sunny with a slight chance of rain in the evening," the response arbitration component 934 may generate a natural language summary of "The weather for today is expected to be mostly sunny with a high of 75 and a low of 68 and a slight chance of rain in the evening," or the like.

Figure 10:
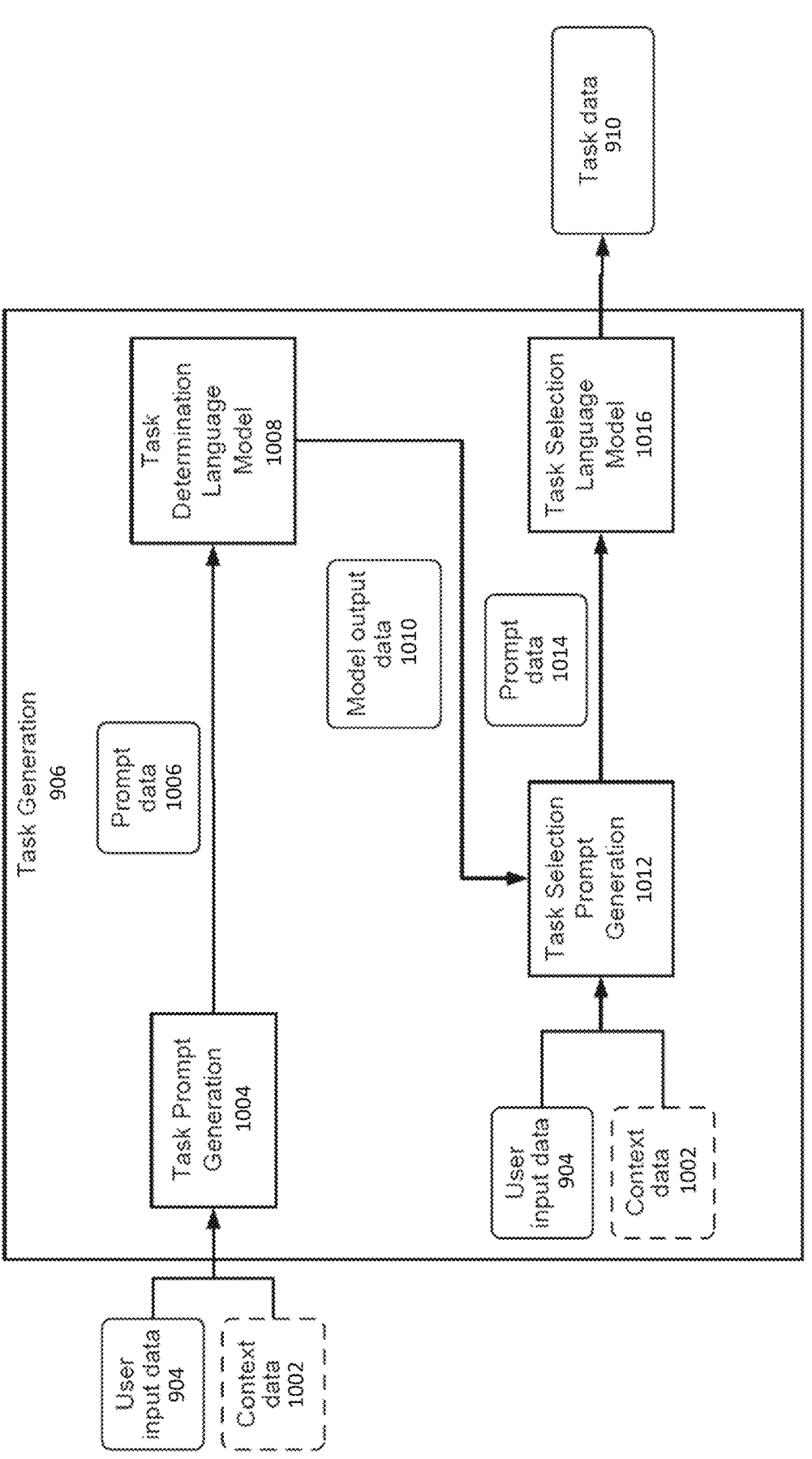
FIG. 10 is a conceptual diagram illustrating example components and processing of a plan generation component, according to embodiments of the present disclosure.

FIG. 10 illustrates example processing of the task generation component 906. As shown in FIG. 10, the task generation component 906 may include a task prompt generation component 1004, a task determination language model 1020, a task selection prompt generation component 1030, and a task selection language model 1040.

As further shown in FIG. 10, the user input data 904 is received at the task prompt generation component 1004, which is configured to generate a list (e.g., one or more) of tasks (e.g., steps/actions) that are to be completed in order to perform an action responsive to the user input and select a task of the list of the tasks that is to be completed first (e.g., in a current iteration of processing by the system 900). As discussed herein above, in some embodiments, the prompt generation component 1004 may correspond to the task prompt generation component 1004, and vice versa.

The task prompt generation component 1004 processes the user input data 904 to generate prompt data 1006 representing a prompt for input to the task determination language model 1008. In some embodiments, the task prompt generation component 1004 may further receive an indication of one or more remaining tasks to be completed with respect to the user input data 904. A task to be completed may correspond to a task for which the system 900 has yet to generate potential responses for (e.g., for which a responding component, such as the API provider component 918, the LLM agent component 920, the skill component 922, the TTS component 924, and/or the context handler component 926 have yet to generate action response data for). Similarly, a completed task may correspond to a task for which the system 900 has generated potential responses for (e.g., for which a responding component, such as the API provider component 918, the LLM agent component 920, the skill component 922, the TTS component 924, and/or the context handler component 926 have generated action response data). For example, if the current iteration of processing with respect to the user input data 904 is a subsequent iteration of processing (e.g., the system previously determined that more than one task is to be completed in order to perform an action responsive to the user input data 904 and has previously generated potential responses for at least a first task of the more than one tasks), then the task prompt generation component 1004 may further receive an indication of the remaining tasks to be completed. In such embodiments, the task prompt generation component 1004 may further receive an indication of the task(s) to complete processing for and/or the potential response(s) of the processing. The task prompt generation component 1004 may further receive the context data 1002 representing various contextual signals associated with/relevant to the user input data 904, such as user profile information (e.g., user ID, user behavioral information, user preferences, age, gender, devices associated with the user profile, etc.), weather information, time of day, device information associated with the device that sent the user input data 904 (e.g., device ID, device states, historical device interaction data, etc.). In some embodiments, the context data 1002 may correspond to the context data retrieved by the context handler component 926. For example, the context data 1002 may be retrieved during a previous iteration of processing by the LLM orchestrator component 912, where the context data 1002 was caused to be retrieved by the LLM shortlister component 908 (e.g., in response to the task generation component 906 determining that the context data is to be retrieved) and sent to the task generation component 906 thereafter (e.g., as potential response data). In other embodiments, the context data 1002 may correspond to the context data stored in the memory storage, as discussed herein. Such prompt data 1006 may be generated based on combining the user input data 904 and the context data 1002 (and, in some embodiments, the indication of the remaining task(s), completed task(s), and/or the potential responses).

In some embodiments, the prompt data 1006 may be an instruction for the task determination language model 1008 to determine one or more tasks (e.g., steps/actions) that are to be completed in order to perform an action responsive to the user input given the other information (e.g., the context data 1002, the indication of the remaining task(s), the indication of the completed task(s), and/or the corresponding potential responses) included in the prompt data 1006.

For example for a user input of "turn on all of the lights except the garage," the task prompt generation component 1004 may generate example prompt data 1006:

{
Create a new task if necessary to help complete a request
    to turn on all of the lights except the garage.
Here are the completed tasks, their potential responses,
    user inputs, and context so far:
[ ]
These are the remaining tasks to be completed:
[ ]

Based on the result, create new tasks to be completed, if
    necessary.
}

In some embodiments, the task prompt generation component 1004 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 1006 may include "Please generate a polite, respectful, and safe response and one that does not violate protected class policy."

The task determination language model 1008 processes the prompt data 1006 to generate model output data 1010 representing one or more predicted tasks to be completed in order to perform the action responsive to the user input. For example, based on processing the first example prompt data provided above, the task determination language model 1008 may output model output data 1010: {"turn on all of the lights except the garage light," } or the like. In some embodiments, the threshold for determining the one or more tasks may be such that the task determination language model 1008 is encouraged to generate multiple predicted tasks for a given user input, where the system 900 may parse and filter the list of tasks during downstream processing (e.g., during the processing of the task selection language model 1016). For example, based on processing the first example prompt data provided above, the task determination language model 1008 may output model output data 1010: {"turn on all of the lights except the garage light," "turn on all lights," "identify which garage light," "turn on all lights then turn off garage light," "turn on all lights where user is located," "turn on kitchen lights, living room lights, dining room lights, hallways lights" "turn on all lights on first floor," } or the like. As discussed herein above, in some embodiments the LLM may correspond to the task determination language model 1008. As such, in such embodiments, the task determination language model 1008 may process, in addition to the processing described herein below, similarly to LLM discussed herein above (e.g., the task determination language model 1008 may determine that context data is needed to generate a response to a user input, such as by generating a context-retrieval task).

As an example of a user input that is associated with more than one task, the LLM orchestrator component 912 may receive a user input of "please order some pizza for dinner" and the task prompt generation component 1004 may generate example prompt data 1006:

{
Create a new task if necessary to help complete a request
    to order some pizza for dinner.
Here are the completed tasks, their potential responses,
    user inputs, and context so far:
[ ]
These are the remaining tasks to be completed:
[ ]
Based on the result, create new tasks to be completed, if
    necessary.
}

The task determination language model 1008 processes the prompt data 1006 to generate model output data 1010 representing one or more predicted tasks to be completed in order to perform the action responsive to the user input. For example, based on processing the example prompt data provided above, the task determination language model 1008 may output model output data 1010: {"identify user pizza preference;" (or some other request for context, such as "determine context to order pizza for dinner") "find application that enables ordering of pizza," } or the like.

As an example of a subsequent round of processing with respect to a user input (e.g., processing performed with respect to a user input that is associated with more than one task), and for the abovementioned user input of "please order some pizza for dinner", the system 900 may process as described herein below to select and complete the task of "identify user pizza preference" (or some other request for context). The task prompt generation component 1004 may process the user input, corresponding context data, the remaining task list, and the potential responses (e.g., the users pizza preference, determined, for example, using the context data 1002 retrieved using the context handler component 926) to generate example prompt data 1006:

{
Create a new task if necessary to help complete a request to order some pizza for dinner.
Here are the completed tasks, their potential responses, user inputs, and context so far:
Completed tasks:
    Identify user pizza preference: user ordered Brooklyn style pizza from [Pizza Company Name 1]
These are the remaining tasks to be completed:
Find application to order pizza
Based on the result, create new tasks to be completed, if necessary.
}

The task determination language model 1008 processes the prompt data 1006 to generate model output data 1010 representing one or more predicted tasks to be completed in order to perform the action responsive to the user input. For example, based on processing the example prompt data provided above, including the context data retrieved using the context handler component 926 during the previous round of processing, the task determination language model 1008 may further output model output data 1010: {"find an application to order pizza" "find API to order [Pizza Company Name 1] pizza," } or the like.

In some embodiments, the one or more predicted tasks may include a task of storing context data. For example, the model output data 1010 may include a task of storing relevant context data used during the processing performed with respect to the user input data 904. For further example, the model output data 1010 may include a task of storing context data that was used during the processing performed with respect to previous user input data.

The model output data 1010 is sent to the task selection prompt generation component 1012, which processes the model output data 1010 to generate prompt data 1014 representing a prompt for input to the task selection language model 1016. In some embodiments, such prompt data 1014 may be generated based on combining the user input data 904, the context data 1002, the prompt data 1006, and/or the model output data 1010. In some embodiments, the task generation component 906 may include another component that parses the model output data 1010 to determine the one or more tasks and may send a representation of the one or more tasks to the task selection prompt generation component 1012.

In some embodiments, the prompt data 1014 may be an instruction for the task selection language model 1016 to select a task of the one or more tasks that is to be completed first (e.g., completed during the current iteration of processing) given the information (e.g., user input data 904, the context data 1002, and the one or more tasks) included in the prompt data 1014. In some embodiments, the prompt data 1014 may further include an instruction for the task selection language model 1016 to determine a priority of the one or more tasks (e.g., an ordered list representing the order in which the one or more tasks are to be completed).

For example, for the example user input provided above of "please order some pizza for dinner," the task selection prompt generation component 1012 may generate example prompt data 1014:

{
Select the top prioritized task given the ultimate goal of order some pizza for dinner
Here are the completed tasks, their potential responses, user inputs, and context so far:
[ ]
Here are the task candidates:
Identify user pizza preference (or some other context retrieval task)
Find an application that sells pizza
Return your selected task, return None if the goal is achieved or indicate existing ambiguities.
}

For further example, for the second round of processing performed with respect to the example user input of "please order some pizza for dinner," the task selection prompt generation component 1012 may generate example prompt data 1014:

{
Select the top prioritized task given the ultimate goal of please order some pizza for dinner
Here are the completed tasks, their potential responses, user inputs and context so far:
Completed tasks:
    Identify user pizza preference: user ordered Brooklyn style pizza from [Pizza Company 1 Name]
Here are the task candidates:
find an application that sells pizza
find API that sells [Pizza Company 1 Name] pizza
Return your selected task, return None if the goal is achieved or indicate existing ambiguities.
}

In some embodiments, the task selection prompt generation component 1012 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The task selection language model 1016 processes the prompt data 1014 to generate model output data representing the task to be completed first and/or a prioritization of the one or more tasks. For example, based on processing the first example prompt data 1014 provided above, the task selection language model 1016 may output model output data: {" 1. Identify user pizza preference," } or the like. For further example, based on processing the second example prompt data 1014 provided above, the task selection language model 1016 may output model output data: {"1. Find an API that sells [Pizza Company Name 1] pizza," } or the like. In some embodiments, during processing of the task selection language model 1016 to select and/or prioritize the one or more tasks, the task selection language model 1016 may update the task list to remove any redundant and/or conflicting tasks. For example, for the example prompt data 1014, the task selection language model 1016 may determine that the remaining tasks of "find an application that sells pizza" and "find an API that sells [Pizza Company Name 1] pizza" are redundant, and that "find an API that sells [Pizza Company Name 1] pizza has a higher priority. Therefore, the task selection language model 1016 may remove the task of "find an application that sells pizza" from the remaining task list. Thereafter, the task generation component 906 (or another component of the task generation component 906) may process the model output data of the task selection language model 1016 to determine task data 910 representing the user input data 904 and/or the task selected by the task selection language model 1016 to be completed first. In some embodiments, the task data 910 may include the remaining one or more tasks and/or may indicate the prioritization of the one or more tasks, as determined by the task selection language model 1016. The task data 910 may be sent to the LLM shortlister component 908, which is described in detail herein below with respect to FIG. 11.

Figure 11:
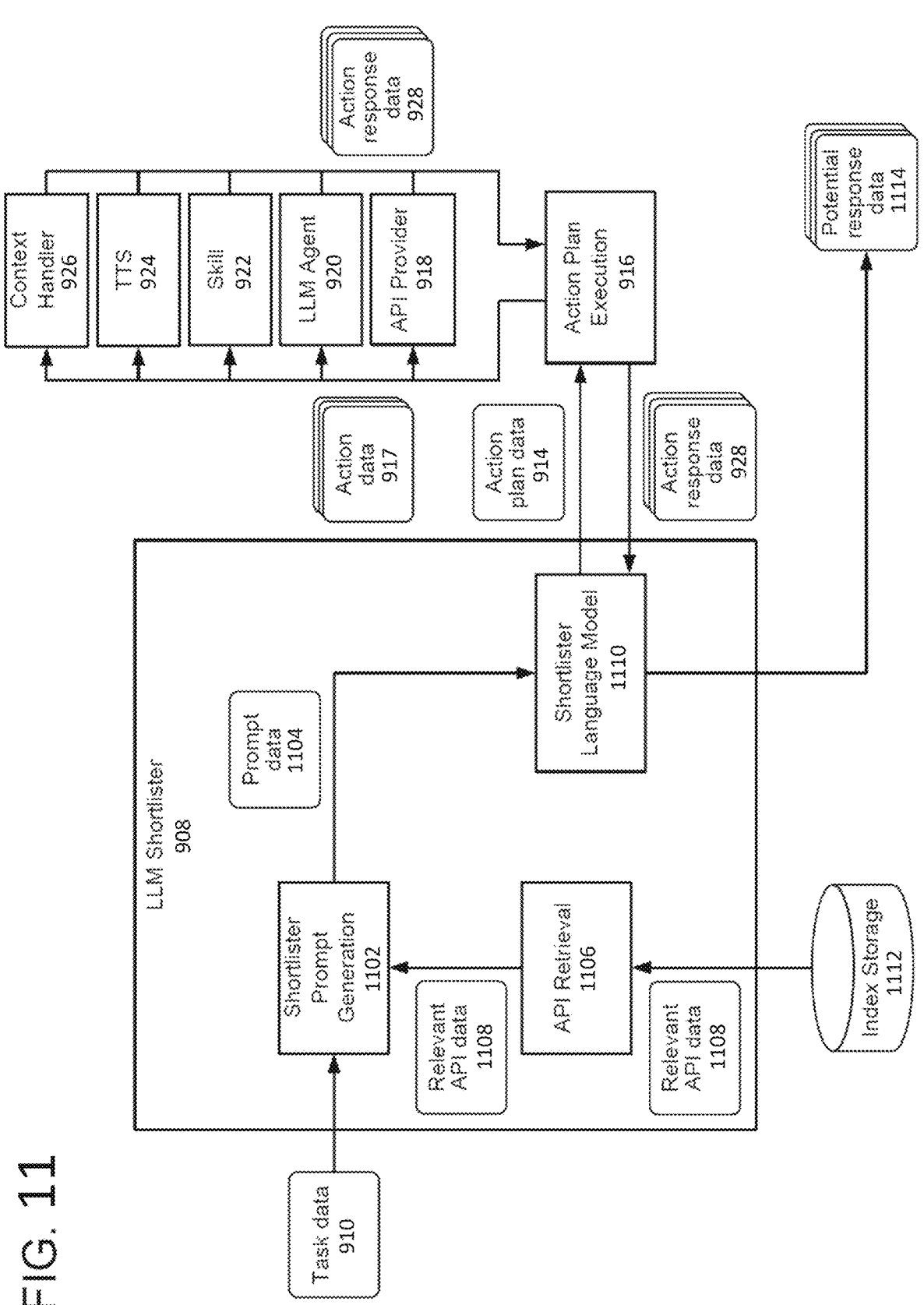
FIG. 11 is a conceptual diagram illustrating example components and processing of a large language model (LLM) shortlister component, according to embodiments of the present disclosure.

FIG. 11 illustrates example processing of the LLM shortlister component 908. As shown in FIG. 11, the LLM shortlister component 908 may include an index storage 1112, an API retrieval component 1106, a shortlister prompt generation component 1102, and a shortlister language model 1110.

The LLM shortlister component 908 is configured to determine one or more components (e.g., APIs (via the API provider component 918, skill component(s) 922, LLM agent component(s) 920, TTS component 924, context handler component 926, etc.) configured to perform an action related to the user input or the current task. The LLM shortlister component 908 is further configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task).

As further shown in FIG. 11, the task data 910 is received at the shortlister prompt generation component 1102. The shortlister prompt generation component 1102 processes the task data 910 to generate prompt data 1104 representing a prompt for input to the shortlister language model 1110. In some embodiments, such prompt data 1104 may be generated based on combining the task data 910 (e.g., the user input data 904, the context data 1002, the selected task, remaining tasks, potential responses associated with one or more previous tasks, etc.) and relevant API data 1108 representing one or more APIs associated with the user input data 904 and/or the current task.

The relevant API data 1108 may be generated by the API retrieval component 1106, which may be configured to retrieve one or more (e.g., top-k) relevant APIs associated with the user input data 904 or the current task. In some embodiments, the APIs may correspond to various components. For example, the components may correspond to rule-based components, ML-based components, LLM-based components, or the like, such as the orchestrator component 1312, the API provider component 918, the LLM agent component 920, the skill component 922, the TTS component 924, the context handler component 926, etc.) In some embodiments, the APIs may correspond to the components.

The API retrieval component 1106 may use retrieval-based approaches to retrieve the one or more relevant APIs from the index storage 1112, which may store various information associated with multiple APIs (and/or components) such as component descriptions, API arguments (e.g., parameter inputs/outputs), identifiers for components (e.g., such as the API provider component 918, the LLM agent component 920, the skill component 922, the TTS component 924, the context handler component 926, etc.) that provides the API, etc. For example, the API retrieval component 1106 may compare one or more APIs (and/or components) included in the index storage 1112 to the user input or the current task to determine one or more APIs (or components) (top-k) that corresponds to the user input or the current task (e.g., APIs (and/or components) that are semantically similar to the user input or the current task, APIs (and/or components) that are capable of performing the current task, etc.). In some embodiments, the API retrieval component 1106 (or another component of the API retrieval component 1106) may determine an encoded representation of the user input or the current task and compare (e.g., using cosine similarity) the encoded representation(s) to an encoded representation of a component description for the API (and/or component) to determine whether the API (and/or component) is semantically similar to the user input or the current task. A component description may correspond to a description of the one or more function that the API (and/or component) is configured to perform and/or other information associated with the API (and/or component) (e.g., an API call formatting structure (e.g., including input parameters), historical accuracy/defect rate, historical latency value, etc.). In some embodiments, the component description may further include one or more exemplars associated with use of the API (and/or component) (e.g., an example user input, corresponding API call, and example API output). If the value of semantic similarity meets or exceeds a threshold, the API (and/or component) (and, optionally, the component description) may be included in the relevant API data 1108. In some embodiments, the API retrieval component 1106 may determine the relevant API data 1108 further using contextual information, including the context data 1002, an accuracy/defect rate value associated with the APIs (and/or components), and/or a historical latency value associated with the APIs (and/or components) (e.g., which may be included in the description of the API). In some embodiments, the index storage 1112 may be included in the API retrieval component 1106. Similar processing may be performed to determine one or more components that are semantically similar to the user input or the current task, which may be included in the relevant API data 1108. The API retrieval may send the relevant API data 1108 to the shortlister prompt generation component 1102.

In some embodiments, the prompt data 1104 may be an instruction for the shortlister language model 1110 to determine one or more APIs (and/or components) that are to process with respect to the user input or the current task (e.g., determine one or more API calls to cause the APIs (and/or components) to process) given the information (e.g., the user input data 904, the context data 1002, the current task, and the relevant API data 1108). As discussed herein above, in some embodiments the prompt generation component 1004 may corresponding to the shortlister prompt generation component 1102. As such, in some embodiments, the shortlister prompt generation component 1102 may, in addition to the processing discussed herein below, process similar to the prompt generation component 1004 (e.g., to generate prompt data for input to an LLM configured to generate a request for context data).

For example, for the selected task of "turn on all of the lights except the garage light" and corresponding relevant API data, the shortlister prompt generation component 1102 may generate example prompt data 1104:

{

Find an execute an API to complete the task of turn on all of the lights except the garage light Here is a list of relevant API available:

Let's chat API

Classic NLU API

Smart Home skill

If no appropriate API is found, summarize as nothing is found.

}

For further example, for the selected task of "Identify user pizza preference" (or some other related context retrieval task) and corresponding relevant API data, the shortlister prompt generation component 1102 may generate example prompt data 1104:

{

Find an execute an API to complete the task of identifying the user's pizza preference Here is a list of relevant API available:

Context Handler API

If no appropriate API is found, summarize as nothing is found.

}

As another example, for the subsequently selected task of "find application to order pizza" and corresponding relevant API data, the shortlister prompt generation component 1102 may generate example prompt data 1104:

{

Find and execute an API to complete the task of find application to order pizza

Here is a list of relevant API available:

Let's chat API

[Food Ordering Application 1] API

[Food Ordering Application 2] API

If no appropriate API is found, summarize as nothing is found.

}

In some embodiments, the shortlister prompt generation component 1102 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The shortlister language model 1110 processes the prompt data 1104 to generate one or more API calls corresponding to request(s) that the corresponding APIs (and/or components) return a potential response to the user input/current task and/or a potential action(s) that the APIs (and/or components) are configured to/will perform with respect to the user input and/or the current task (e.g., a natural language description of the potential action(s)). In some embodiments, the shortlister language model 1110 may generate API calls for a subset of the APIs represented in the prompt data 1104. For example, based on processing the first example prompt data provided above, the shortlister language model 1110 may output model output data: {"Use Let's chat API to turn on all of the lights except the garage light, Use Smart Home skill to turn on all of the lights except the garage light"}, {"Letschat ("turn on all of the lights except the garage light"), or the like. For further example, based on processing the second example prompt data provided above, the shortlister language model 1110 may output model output data: {"retrieve context to identify user's pizza preference," } or the like. As another example, based on processing the third example prompt data provided above, the shortlister language model 1110 may output model output data: {"Use [Food Ordering Application 1] to order pizza, Use [Food Ordering Application 2] to order pizza,"} or the like.

As discussed herein above, in some embodiments, the LLM may correspond to the shortlister language model 1110. In such embodiments, the shortlister language model 1110 may, in addition to the processing discussed herein with respect to FIG. 11, process similar to the LLM. For example, the shortlister language model 1110 may be configured to generate a request for the context handler component 926 to retrieve context data relevant to the user input data 904 and/or one or more of the tasks. For further example, the shortlister language model 1110 may be configured to generate a request for the context handler component 926 to store context data, such as in response to a corresponding task and/or in response to a request from the response arbitration component 934.

The shortlister language model 1110 may generate the one or more APIs calls (including the required input parameters) by applying in-context learning for cold-starting API calls (e.g., one-shot/few-shot learning). For example, in embodiments where the relevant API data 1108 includes the component descriptions, the shortlister language model 1110 may use the one or more exemplars included in the component descriptions (included in the prompt data 1104) to determine the one or more input parameters for the API call. In some embodiments, the shortlister language model 1110 may be finetuned on such exemplars (e.g., during offline or runtime processing), such that the shortlister language model 1110 is capable of determining the one or more input parameters for the given API call.

During processing of the shortlister language model 1110 and after generating the one or more requests, the shortlister language model 1110 may cause the one or more requests to be executed. For example, as shown in FIG. 11, the shortlister language model 1110 may send action plan data 914 representing the one or more requests to the action plan execution component 916, which causes execution of the one or more requests included in the action plan data 914. For example, the action plan execution component 916 may process the action plan data 914 to generate action data 917. Action data 917 may represent, for example, an instruction (e.g., an executable API call determined from/generated based on the action plan data 914) for a particular API to process with respect to the user input and/or the current task. In embodiments where the action plan data 914 includes requests corresponding to incomplete API calls, API call formats, indications of actions to be performed by one or more components, the action plan execution component 916 may be configured to generate executable API calls corresponding to the action plan data 914. In some embodiments, the action plan execution component 916 may generate the action data 917 to represent an instruction to provide the responses including the potential response(s)/potential action(s) with respect to the user input and/or the current task.

In some embodiments, the shortlister language model 1110 may send model output data including the one or more requests to another component of the LLM orchestrator component 912, which may be configured to parse the model output data to identify the one or more requests. Thereafter, the component may generate the action plan data 914 representing the one or more requests and send the action plan data 914 to the action plan execution component 916.

The action plan execution component 916 may send the action data 917 to the API provider component 918, the LLM agent component 920, the skill component 922, the TTS component 924, and/or the context handler component 926. The API provider component may include one or more components (e.g., rule-based components, ML-based components, LLM-based components, or the like) that may be caused to process using the action data 917 (e.g., using the API calls generated by the LLM shortlister component 908).

The TTS component 924 may be configured to process textual or tokenized input to generate audio data representing synthesized speech corresponding to the textual or tokenized input spoken by a synthetic voice. The processing of the TTS component 924 is discussed in detail below with respect to FIG. 13.

The skill component 922 may be software running on the system component(s) 110 that is akin to a software application. That is, a skill component 922 may enable the system component(s) 110 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 110 may be configured with more than one skill component 922. For example, a weather service skill component may enable the system component(s) 110 to provide weather information, a car service skill component may enable the system component(s) 110 to book a trip with respect to a taxi or ride sharing service, a restaurant skill component may enable the system component(s) 110 to order a pizza with respect to the restaurant's online ordering system, etc. A skill component 922 may operate in conjunction between the system component(s) 110 and other devices, such as the user device(s) 104, in order to complete certain functions. A skill component 922 may include hardware, software, firmware, or the like that may be dedicated to a particular skill component 922 or shared among different skill components 922.

The LLM agent component 920 may correspond to one or more LLM agents. An LLM agent component 920 may correspond to a custom instantiation of an LLM (and other components) that is configured to handle user inputs relating to a particular domain/functionality. In some embodiments, the LLM agent component 920 may be configured to handle specific use cases via particular prompt generation, fine-tuning of the LLM, etc. For example, the LLM agent component 920 may be configured to handle user inputs/tasks related to information query, the LLM agent component 920 may be configured handle user inputs/tasks related to shopping, the LLM agent component 920 may be configured to handle user inputs/tasks related to ordering food from various restaurants, the LLM agent component 920 may be configured to handle user inputs/tasks related to ordering food from a particular restaurant (e.g., a particular pizza restaurant), the LLM agent component 920 may be configured to handle user inputs/tasks related to booking a hotel, the LLM agent component 920f may be configured to handle user inputs/tasks related to booking a flight, etc.

The API provider component 918 may include various components that may be caused to execute using the action data 917. For example, the API provider component 918 may include an entity recognition (ER) component, which may be configured to process textual or tokenized input to link one or more entity references included in the textual or tokenized input to a specific corresponding entity known to the system 900. For example, based on the textual or tokenized input (e.g., a context of the textual or tokenized input), the ER component may determine that a reference to "Neil Armstrong" is directed to the American astronaut. In some embodiments, the action data 917 may include an indication(s) (e.g., slots) of one or more entities included in the user input, as determined by one or more of the language models described with respect to FIG. 10, in which case the ER component may process to link the one or more entities to the specific, referenced, entity known to the system 900.

In other embodiments, the ER component may be configured to process the action data 917 to determine the one or more entities included in the user input and link the one or more determined entities to the specific, referenced, entity (entities) known to the system 900. For example, the ER component may include one or more recognizers. Each recognizer may include a named entity recognition (NER) component. The NER component applies grammar information and lexical information (received from a storage) associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.). Thereafter, the ER component links a slot of text data to a specific entity known to the system. To perform entity resolution, the ER component may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

For further example, the API provider component 918 may include a search component, which may be configured to query a storage (e.g., a database, repository, knowledge base, etc.) for information usable for generating a response to a user input. For example, if the action data 917 represents a request for information of "Who won the game between [Team 1 Name] and [Team 2 Name]," then the search component may query the storage (or other sources, such as the Internet), to retrieve the information "[Team 1 Name] won the game between [Team 1 Name] and [Team 2 Name]."

As an even further example, the API provider component 918 may include the device controller component discussed herein above, which may be further configured to cause a device to perform an action corresponding to the action data 917.

In some embodiments, the API provider component 918 may include a domain service component, which may be configured for interacting with one or more services defined by particular users, such as developers, specialists, or the like (e.g., to receive information, such as responses or annotations, to cause an action.

One or more of abovementioned components may send action response data 928 representing one or more potential responses generated by the one or more APIs corresponding to the action data 917 (e.g., the potential response(s) and/or potential action(s)) to the action plan execution component 916. For example, in response to an API call to the skill component 922 associated with a user input for turning on a light, the action response data 928 may correspond to a potential action of "turn on the light," or the like. For further example, in response to an API call to the context handler component 926 associated with retrieving context for a user input for ordering pizza, the action response data 928 may correspond to context data representing the user has previously indicated that they prefer Brooklyn style pizza. For further example, in response to an API call to the skill component 922 associated with a user input for ordering a pizza from a particular restaurant, the action response data 928 may correspond to a potential action of "order medium pizza from [restaurant name]", or the like. The action plan execution component 916 may send the action response data 928 to the shortlister language model 1110.

In some embodiments, the action plan execution component 916 may send the action response data 928 to the shortlister prompt generation component 1102, which may generate further prompt data including the action response data 928 and be sent to the shortlister language model 1110. For example, the further prompt data may be generated based on combining the prompt data 1104 and the action response data 928.

In some embodiments, the shortlister language model 1110 may process the action response data 928 (or the further prompt data including action response data 928) to generate a natural language summary of the action response data (e.g., the potential response data 930). In some embodiments, the potential response data 930 may include an association between action response data 928 (or a summarized representation of the action response data 928) and an indication of the API/component that generated the action response data 928 (e.g., a component identifier, component description, etc.). In some embodiments, the shortlister language model 1110 may be configured to filter and/or rank the action response data 928 based on how relevant the action response data 928 is to the current task. In some embodiments, the shortlister language model 1110 may be configured to filter and/or rank the action response data 928 based on a confidence level of the component that provided the action response data, where the confidence level may indicate a likelihood of the component being able to respond (e.g., within a period of time), the component being able to perform a potential action that corresponds to the current task, etc. In some embodiments, the action response data 928 may indicate whether or not the corresponding component is able to respond (e.g., the action response data 928 may include a Boolean value such as "yes" or "no" or other similar indications). In some embodiments, the shortlister language model 1110 may filter and/or rank the action response data 928 based on information included in the prompt data 1104 (e.g., the user input data 904, the relevant API data 1108, the context data 1002, the prompt data 1006, etc.). For example, the potential response data 930 may include a subset of the action response data 928 (or the summarized representations of the action response data 928) and may further include a representation of a confidence associated with the action response data 928 (or a summarized representation of the action response data 928). As such, the potential response data 930 may further include data representing a confidence of how relevant the action response data 928 is to the current task. In some embodiments, the shortlister language model 1110 may consider a rating associated with the component that provided the action response data 928, where the rating may be a user satisfaction rating provided by multiple different users of the system 900, a user satisfaction rating provided by the user 902 associated with the user input data 904, a system generated rating based on the number of past tasks handled by the component, an accuracy rating based on the number of past tasks the component had handled correctly/provided a desired response for, etc.

The LLM shortlister component 908 may send the potential response data 930 for further processing. In instances where the task generation component 906 determined that more than one task is to be completed, the LLM shortlister component 908 may send the potential response data 930 to the task generation component 906, which may process as described herein above to maintain and prioritize the task list based on the potential response data 930 and select a new task to be completed. For example, in the instance where the selected task was "identify user's pizza preference," or some other context retrieval task, the shortlister language model 1110 may send potential response data 928 corresponding to the context data retrieved by the context handler component 926 to the task generation component 906, to process as described herein above with respect to FIG. 10.

In instances where the task generation component 906 determined that only one task is to be completed, or in instances where the LLM shortlister component 908 determines that there are no remaining tasks to be completed, the LLM shortlister may send the potential response data 930, and the potential responses associated with previously completed tasks (e.g., previous action response data) to the response arbitration component 934 to process as discussed herein above. The LLM shortlister component 908 may further send the user input data 904, the context data 1002, etc., to the task generation component 906 and/or the response arbitration component 934.

As discussed herein above, in some embodiments, the LLM orchestrator component 912 may further include a memory storage which may store various information associated with the processing performed. In addition, or alternative, the memory storage may store any of the additional information discussed herein above that was determined/generated during one or more previous iterations of processing by the LLM orchestrator component 912 for the user input data 904 (e.g., the user input data 904, the prompt data 1006, the context data 1002, the model output data 1010, prompt data 1014, the task data 910, the relevant API data 1108, the prompt data 1104, the action plan data 914, the action response data 928, the potential response data 930, etc.). As such, after the LLM shortlister component 908 generates the potential response data 930, the LLM orchestrator component 912 may send the abovementioned data to the memory storage. In some embodiments, the above-mentioned data may be sent to the memory storage as it is generated by the system 900.

In such embodiments, one or more of the prompt generation components discussed herein may be configured to include (e.g., append) one or more portions of the data included in the memory storage in the data (e.g., the generated prompts) to the corresponding language models. For example, during a subsequent iteration of processing, the task prompt generation component 1004 may receive one or more portions of the data included in the memory storage (which were generated during one or more previous iterations of processing performed with respect to the user input data 904) and include the one or more portions of data in the prompt data 1006.

Figure 12:
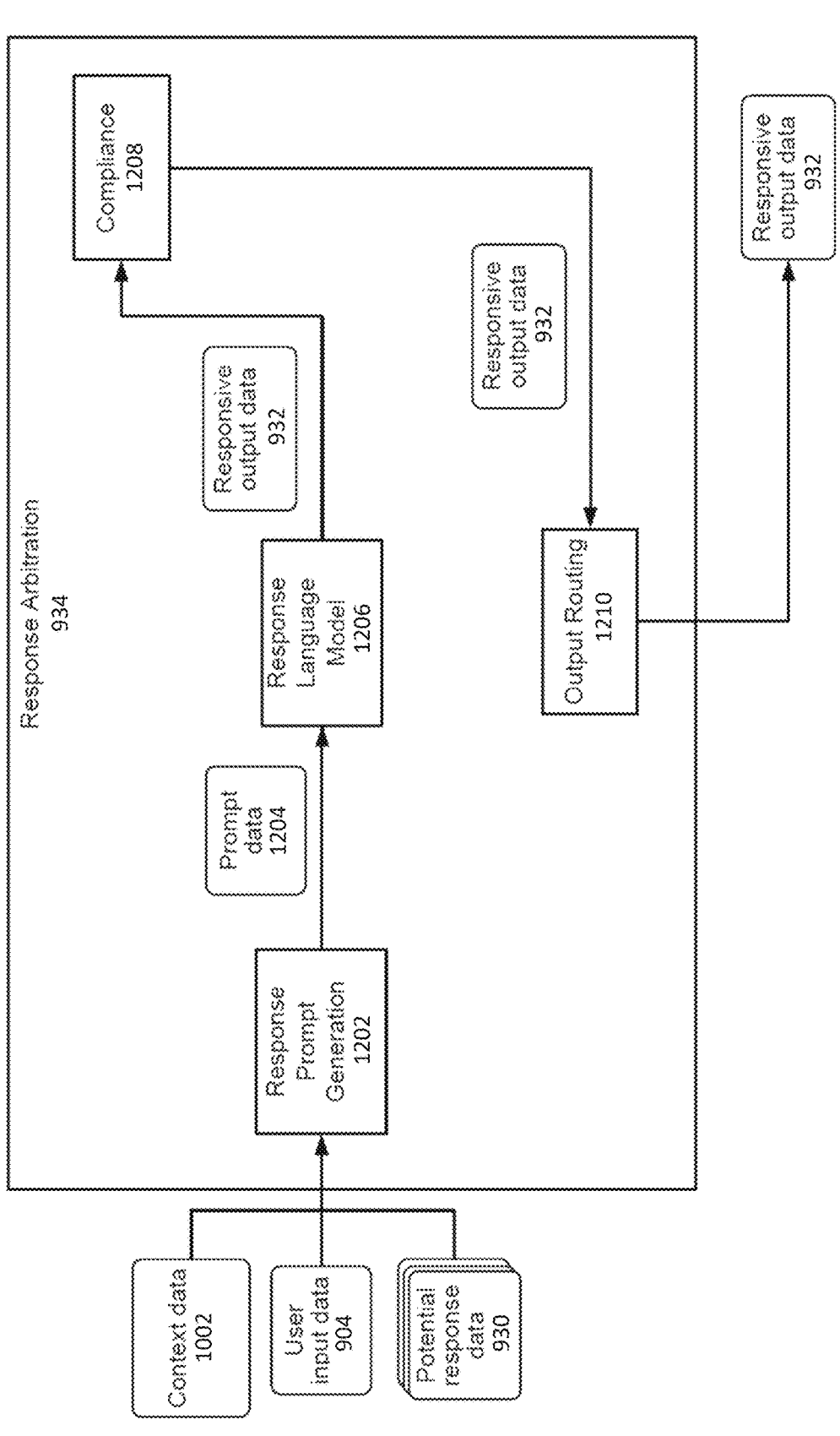
FIG. 12 is a conceptual diagram illustrating example component and processing of a response arbitration component, according to embodiments of the present disclosure.

FIG. 12 illustrates example components and processing of the response arbitration component 934. As shown in FIG. 12, the response arbitration component 934 may include a response prompt generation component 1202, a response language model 1206, a compliance component 1208, and an output routing component 1210. As discussed herein above, the response arbitration component 934 processes the potential response data 930 (representing the potential responses generated by the one or more components determined to be associated with the user input) to determine whether one or more of the potential responses generated by the system 900 are responsive to the user input. The response arbitration component 934 may then generate the natural language response to the user input.

As shown in FIG. 12, the response arbitration component 934 receives the user input data 904, the context data 1002, and/or the potential response data 930 (output by the LLM shortlister component 908) at the response prompt generation component 1202. As discussed herein above, in some embodiments, the prompt generation component 1004 may correspond to the response prompt generation component 1202. In such embodiments, the response prompt generation component 1202 may, in addition to the processing described herein below, process similarly to the prompt generation component 1004 (e.g., to generate prompt data to be processed to generate a response to a user input).

The response prompt generation component 1202 may process the user input data 904, the context data 1002, and the potential response data 930 (and, optionally, the further information received from the LLM shortlister component 908) to generate prompt data 1204 representing a prompt for input to the response language model 1206. In some embodiments, the prompt data 1204 may be an instruction for the response language model 1206 to determine whether one or more of the potential responses represented in the potential response data 930 are responsive to the user input given the other information (e.g., the context data 1002, the potential responses associated with the previous tasks (e.g., previous action response data) associated with the user input, and the user input data 904) included in the prompt data 1204. The prompt data 1204 may further be an instruction for the response language model 1206 to, if the response language model 1206 determines that one or more of the potential responses are responsive to the user input, cause performance of the one or more corresponding actions (e.g., the one or more potential actions included in the selected responses) and/or cause the system 900 to inform the user 902 of the one or more selected responses. For example, in some embodiments, prompt data 1204 may further instruct the response language model 1206 to generate a natural language summary of the one or more selected responses determined to be responsive to the user input. The prompt data 1204 may instruct the response language model 1206 to cause the system 900 to output the natural language summary to the user 902.

In some embodiments, the prompt data 1204 may further be an instruction for the response language model 1206 to, if the response language model 1206 determines that none of the potential responses are responsive to the user input, generate a request for additional information (e.g., further context data) from a component (e.g., the context handler component 926) of the system 900 and/or the user 902. The additional information may be any information usable to determine and/or perform an action responsive to the user input (e.g., to resolve an ambiguity associated with the user input and/or a task(s) associated with the user input), such as further context data relevant to the user input data 904 and/or the potential response data 930. In some embodiments, the response language model 1206 may perform certain steps/intermediate steps such as "Think," "Act," and/or "Response," as discussed herein above.

For example, for the example user input of "What is the weather for today" and corresponding potential responses output by the LLM shortlister component 908, the response prompt generation component 1202 may generate example prompt data 1204:

{
"If applicable, summarize the responses that satisfy the user's request. If applicable, call the corresponding API's to perform the potential actions that satisfy the user's request. If no response is needed, indicate that."
Here is the user's request:
What is the weather for today
Here are the potential responses and potential actions:
Skill component A: It is currently 70 degrees, with a high of 75 and a low of 68
Skill component B: The weather for today is expected to be mostly sunny, but with a chance of rain in the late afternoon
}

For further example, for the example user input of "please order some pizza for dinner" and corresponding potential responses output by the LLM shortlister component 908, the response prompt generation component 1202 may generate example prompt data 1204:

{
Here is the user's request:
Please order some pizza for dinner
Here is the context:
Component A: User ordered Brooklyn style pizza from [Pizza Company 1 Name]
Here are the potential responses and potential actions:
[Food Ordering Application 1] API: Use [Food Ordering Application 1] to order pizza from [Pizza Company 1 Name]
[Food Ordering Application 2] API: Use [Food Ordering Application 2] to order pizza from [Pizza Company 2 Name]
}

In some embodiments, the response prompt generation component 1202 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 1204 may include "Please generate a polite, respectful, and safe response and one that does not violate protected class policy."

The response language model 1206 processes the prompt data 1204 to generate the responsive output data 932 representing the one or more selected responses determined to be responsive to the user input, the natural language summary of the one or more selected responses, and/or the request for additional information.

If the response language model 1206 determines that one or more of the potential responses are responsive to the user input, the response language model 1206 may generate the responsive output data 932 to represent the one or more selected responses or a natural language summary of the one or more selected responses to be output to the user. For example, based on processing the first example prompt data above, the response language model 1206 may select one of the potential responses (e.g., the potential responses from skill component A (e.g., a weather skill component)) determined to be responsive to the user input to generate responsive output data 932: {"It is currently 70 degrees, with a high of 75 and a low of 68," } or the like. For further example, based on processing the first example prompt data provided above, the response language model 1206 may select more than one of the potential responses (e.g., the potential responses from both the skill component A and skill component B) determined to be responsive to the user input and generate a summary of the selected responses to generate responsive output data 932: {"It is expected to be mostly sunny today, with a high of 75 and a low of 68, but with a chance of rain in the late afternoon," } or the like.

As another example, based on processing the second example prompt data provided above, the response language model 1206 may select one of the potential responses (e.g., the potential response from Component A (e.g., the context data received from the context handler component 926) representing that the user ordered Brooklyn style pizza from [Pizza Company 1 Name]) determined to be responsive to the user input to generate responsive output data 932: {"Ok, I will place an order for Brooklyn style pizza from [Pizza Company 1 Name]," } or the like. As a further example, based on processing the second example prompt data provided above, the response language model 1206 may select more than one of the potential responses (e.g., the potential responses from both component A and API A) determined to be responsive to the user input and generate a summary of the selected responses to generate the responsive output data 932: {"Ok, I will place an order for Brooklyn style pizza from [Pizza Company 1 Name] using [Food Ordering Application 1] API," } or the like.

As such, the response language model 1206 may select between the one or more potential responses from one or more different components (e.g., for the first example prompt data, the potential responses from the skill component A and the skill component B and, for the second example prompt data, the potential responses from Component A, API A, and API B) to determine that a subset of the potential responses are responsive to the user input. Thereafter, the response language model 1206 may cause output of the selected responses (e.g., the subset of potential responses) or a natural language summary of the selected responses to the user.

In some embodiments, the response arbitration component 934 may also generate and send an instruction to the components, (e.g., API(s), components, agents, etc.) configured to perform the potential actions included in the selected responses to cause performance of the potential actions (or another component of the system 900 configured to cause the components to perform the potential actions, such as the action plan execution component 916, which is discussed in more detail herein below). For example, in instances where the selected responses include a potential action to be performed, the response language model 1206 may further cause the corresponding components to perform the potential action (e.g., cause [Food Ordering Application 1] API to order the Brooklyn style pizza from [Pizza Company 1 Name] using [Food Ordering Application 1]). In other embodiments, the system 900 may not generate and/or send the instruction until approval to perform the action(s) is received from the user 902.

In some embodiments, the response arbitration component 934 may also generate and send an instruction to the context handler component 926 (or the LLM shortlister component 908) to store (or cause the context handler component 926 to store) context data (e.g., the context data 1002) associated with the processing performed to generate the responsive output data 932.

If the response language model 1206 determines that none of the potential responses are responsive to the user input and/or that an ambiguity exists with respect to the user input and/or one or more of the determined tasks, the response language model 1206 may generate the responsive output data 932 to represent a request to be output to the user and/or the context handler component 926. For example, based on processing the first example prompt data provided above, the response language model 1206 may determine an ambiguity exists with respect to the size of the pizza to be ordered and may generate the responsive output data 932: {"What size pizza should I order?",} {"What size pizza does the user usually order?",} or the like to be output to the user and/or sent to the context handler component 926.

The response language model 1206 may send the responsive output data 932 to the compliance component 1208, which is configured to determine whether model output data generated by the response language model 1206 is appropriate for output to the user 902. In other words, the compliance component 1208 processes the responsive output data 932 to determine whether the responsive output data 932 includes any inappropriate/sensitive information that should not be output to the user 902 (e.g., confidential information, offensive language, etc.). In some embodiments, the compliance component 1208 may be configured to compare the responsive output data 932 to one or more words determined to be inappropriate/sensitive and should not be output to the user 902. In some embodiments, the compliance component 1208 may include/implement an ML model. For example, the ML model may process the responsive output data 932 to determine whether the responsive output data 932 includes any inappropriate/sensitive information. During training, the ML model may take as input a plurality of training natural language inputs, where the ML model is tasked with classifying a natural language input as including inappropriate/sensitive information or not. The output of the ML model (e.g., 0, 1, a value between 0 and 1, or the like) resulting from processing with respect to a training natural language input may be compared to a corresponding label representing whether the natural language input includes inappropriate/sensitive information or not. Based on the comparison, one or more parameters of the ML may be configured. In some embodiments, the ML model may be a classifier.

If the output of the compliance component 1208 indicates that the responsive output data 932 includes information that is not appropriate for output to the user 902, the compliance component 1208 may cause further processing of the responsive output data 932 by downstream components to halt. In some embodiments, the response arbitration component 934 may cause the response language model 1206 to generate new responsive output data to be evaluated by the compliance component 1208. For example, the response arbitration component 934 may cause the response prompt generation component 1202 to generate new prompt data, which may include the prompt data 1204, the responsive output data 932, and an indication that the responsive output data 932 is not appropriate for output to the user 902. The new prompt data may be an instruction to generate new model output data that is appropriate for output to the user 902.

If the output of the compliance component 1208 indicates that the responsive output data 932 are appropriate for output to the user, the compliance component 1208 may send the responsive output data 932 to the output routing component 1210. The output routing component 1210 processes the responsive output data 932 to determine one or more components that are to be caused to process in response to the responsive output data 932. In other words, the output routing component 1210 parses the responsive output data 932 to determine one or more components that the responsive output data 932 is to be routed to (or that are to be caused to process based on the responsive output data 932).

For example, in an instance where the response language model 1206 determines that one or more of the potential responses are responsive to the user input and generates the responsive output data 932 including the one or more selected responses (or a natural language summary of the one or more selected responses)/the request for additional information, the output routing component 1210 may parse the responsive output data 932 to determine the selected responses/the natural language summary and send the responsive output data 932 to a component configured to generate corresponding data to be output to the user 902. For example, the output routing component 1210 may send the responsive output data 932 to the TTS component 924, which may process as described herein above to generate output audio data including synthesized speech corresponding to the responsive output data 932, which the system 900 may send to the user device(s) 104 for output to the user 902. In some embodiments, the system 900 may further include a component configured to generate visual output data (e.g., output image and/or video data) corresponding to the responsive output data 932, which may be sent to the user device(s) 104 to be output to the user.

For further example, in embodiments where the responsive output data 932 includes selected responses (e.g., the responsive output data 932) that include one or more potential actions to be performed, the output routing component 1210 may process as described herein above to determine the one or more selected responses/the natural language summary and send the responsive output data 932 to the one or more components associated with the selected responses. In such embodiments, the responsive output data 932 may further include an instruction for the one or more components to perform the potential actions corresponding to the selected responses. For example, in some embodiments, the components corresponding to the potential responses included in the potential response data 930 may, after generating the potential responses, suspend processing required to perform the potential action included in the potential responses and await an instruction from the system 900 to perform the potential action. As such, the output routing component 1210 may include the instruction in the responsive output data 932 to cause the component to perform the potential action. In some embodiments, the output routing component 1210 may generate an API call configured to cause the component to perform the action.

In some embodiments, where the responsive output data 932 includes selected responses that include one or more potential actions to be performed, the responsive output data 932 may further request authorization from the user 902 to perform the one or more potential actions responsive to the user input. After receiving the request authorization (e.g., via a subsequent user input) the response arbitration component 934 may generate and send the corresponding instruction (or API call) to perform the one or more potential actions responsive to the user input. In some embodiments, the system 900 may store data indicating prior authorization to perform the one or more potential actions responsive to the user input (or one or more actions similar to the one or more potential actions), in which case the response arbitration component 934 may use such data as authorization to perform the one or more potential actions. For example, the user 902 may have previously provided authorization for a set of actions (e.g., turning on outside lights). Thereafter, the system 900 may determine the one or more potential actions to be performed in response to the user input data 904. If the system 900 determines that the one or more actions are included in the set of actions previously authorized by the user 902, the system 900 may not ask for further authorization prior to causing the one or more potential actions to be performed.

For further example, in an instance where the response language model 1206 generates the responsive output data 932 including a request for additional information (in response to the response language model 1206 determining that none of the potential responses are responsive to the user input and/or further context data relevant to the user input, one or more of the tasks, and/or the potential responses is needed), which may be determined by the output routing component 1210 based on, for example, the responsive output data 932 including a question, the output routing component 1210 may parse the responsive output data 932 to determine whether the request for additional information is to be sent to the context handler component 926 and/or output to the user 902. In some embodiments, the response language model 1206 may include in the responsive output data 932 an indication of whether the request for additional information should be sent to the context handler component 926 and/or output to the user 902. In some embodiments, unless otherwise indicated in the responsive output data 932, the output routing component 1210 may determine to send the request for additional information to the context handler component 926 prior to outputting the request for additional information to the user 902. In the instance where the context handler component 926 is unable to determine relevant context data (or a component of the system 900 is unable to resolve the ambiguity using the context data received from the context handler component 926), the output routing component 1210 may determine the request for additional information is to be output to the user 902.

In some embodiments, the response arbitration component 934 may be configured to further process data representing a potential response to the user input that is generated by one or more other components of the system 900 not included in the LLM orchestrator component 912. For example, the response arbitration component 934 may further receive data from an orchestrator component 1312 (discussed in detail herein below with respect to FIG. 13) representing a potential response to the user input (e.g., the output of the skill component 922), where the orchestration of the processing performed to generate the potential response was performed by the orchestrator component 1312, rather than the LLM orchestrator component 912. In such embodiments, the response arbitration component 934 may be further configured to arbitrate between first potential responses received as a result of the processing of the LLM orchestrator component 912 and second potential responses received as a result of the processing of the orchestrator component 1312. As discussed above, the response arbitration component 934 may select one or more portions (e.g., potential actions, potential responses, etc.) of the first potential responses and/or the second potential responses that are determined to be responsive to the user input and cause output of the one or more portions (or a summarized representation of the one or more portions) and/or performance of the potential actions corresponding to the selected responses.

In some embodiments, the data received from the orchestrator component 1312 may be included in the potential response data 930. For example, the orchestrator component 1312 may be determined to be configured to perform a function (e.g., cause another component(s) to perform a function) potentially relevant to the user input such that the LLM shortlister component 908 may cause the orchestrator component 1312 to generate potential responses potentially responsive to the user input, which may be included in the potential response data 930 sent to the response arbitration component 934.

In some embodiments, the language models of FIGS. 10, 11, and/or 12 may be fine-tuned to perform a particular task(s). Fine-tuning of the language models may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, as discussed above, one or more components of the system 900 discussed herein above may be configured to begin processing with respect to data as soon as the data or a portion of the data is available to the one or more components. Some components of the system 900 are generative components/models that can begin processing with respect to portions of data as they are available, instead of waiting to initiate processing after the entirety of data is available. In other words, the system 900 may be configured to stream portions of data associated with processing with respect to a user input to the one or more components such that the one or more components may begin performing their configured processing with respect to that data as soon as it is available to the one or more components. For example, if the output of the task determination language model 1008, the task selection language model 1016, and/or the shortlister language model 1110 indicates that additional information is needed to complete a first task associated with a user input, a request for the additional information may be sent to the context handler component 926. Thereafter, the task determination language model 1008, the task selection language model 1016, and/or the shortlister language model 1110 may continue to process to complete their configured operations. For example, while the context handler component 926 is processing to determine the context data, the system 900 may begin processing with respect to a second task associated with the user input. Thereafter, the output of the context handler component 926 may be sent to the response arbitration component 934 such that once the response arbitration component 934 receives the output of the LLM shortlister component 908, the response arbitration component 934 may resolve the ambiguity that resulted in the request for the context data in order to generate the responsive output data 932. For further example, if the user input data 904 is generated to include the natural language representation of the user input, but the processing required to determine the corresponding contextual signals (e.g., weather data, time of data, dialog history, device information, etc.) is yet to be completed, the task generation component 906 may begin processing with respect to the natural language representation of the user input. Once the corresponding contextual signals have been generated, the task generation component 906 may begin processing with respect to the contextual signals and may update downstream components with the result of the processing with respect to the contextual signals.

As another example, if the task generation component 906 determines that more than one task is to be completed to perform an action responsive to a user input, and the LLM shortlister component 908 processes as described herein above to cause one or more components to generate potential responses with respect to a first task of the more than one tasks, the LLM shortlister component 908 may send the potential responses (and a representation of the user input and the current task) to the response arbitration component 934 to process as described herein above with respect to those potential responses while the system 900 (e.g., the task generation component 906 and/or the LLM shortlister component 908) completes processing with respect to the remaining tasks of the one or more tasks. Therefore, the response arbitration component 934 may process as described herein to select between the potential responses associated with the first task while the potential responses associated with one or more of the remaining tasks is completed. As such, the response arbitration component 934 may only need to arbitrate between the potential responses associated with the first task that were previously selected by the response arbitration component 934 as being responsive to the first task when the response arbitration component 934 later processes with respect to further potential responses associated with further tasks.

As a further example, if the API retrieval component 1106 determines (e.g., with a confidence value that meets or exceeds a particular threshold) that a particular API or component description should be included in the relevant API data, the API retrieval component 1106 may provide the corresponding relevant API data to the shortlister prompt generation component 1102 so that the shortlister prompt generation component 1102 may begin processing with respect to the relevant API data while the API retrieval component 1106 continues to determine one or more further relevant API data. In general, the system 900 is capable of performing such streaming and processing of portions of data discussed herein (e.g., for processing with respect to a user input) and updating downstream components with the results of processing of newly available portions of data as the data becomes available for processing.

Figure 13:
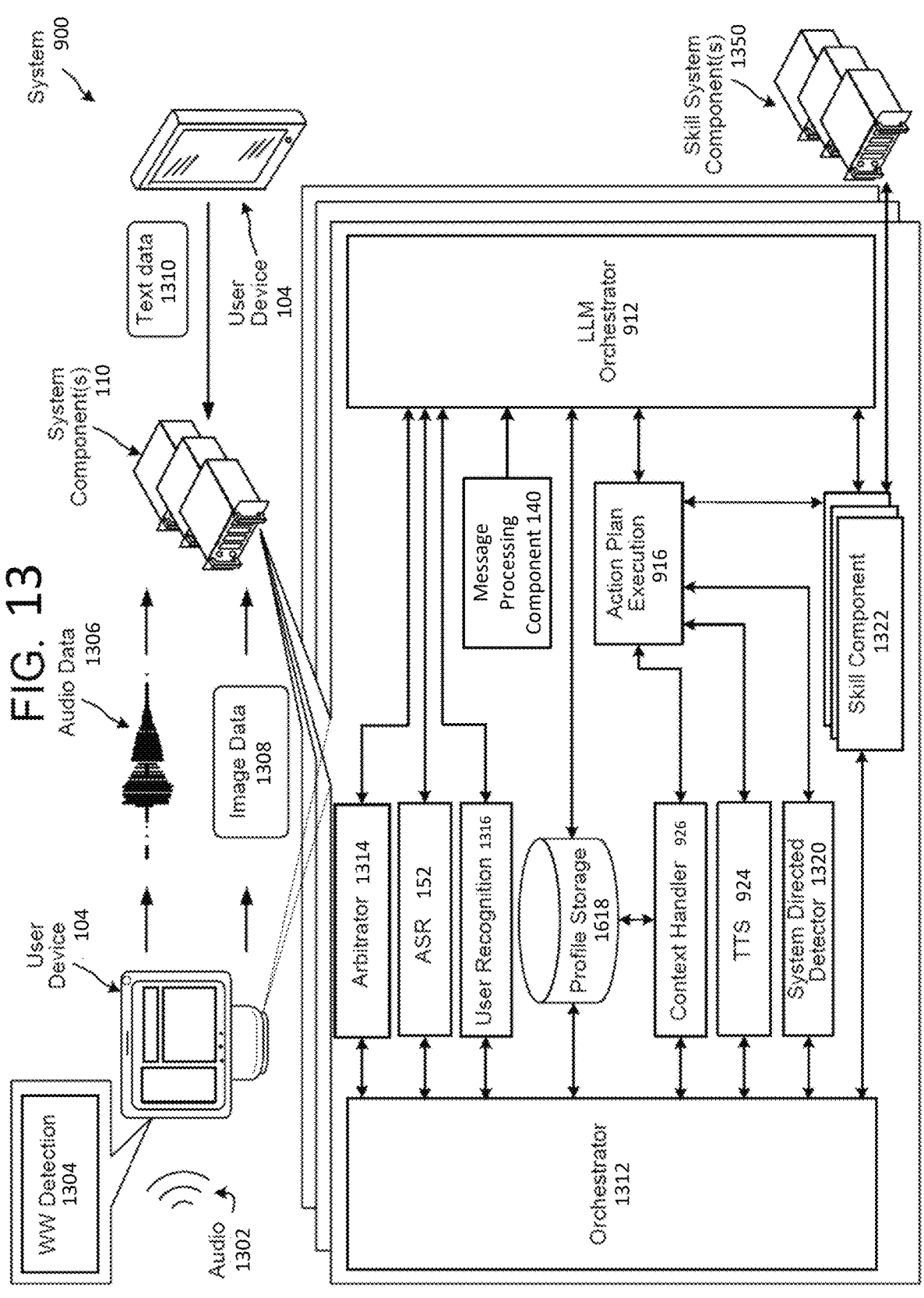
FIG. 13 is a conceptual diagram of components of the system, according to embodiments of the present disclosure.

The system 900 may operate using various components as described in FIG. 13. The various components may be located on same or different physical devices. Communication between various components may occur directly or across a networks(s) 106. The user device(s) 104 may include audio capture component(s), such as a microphone or array of microphones of a user device(s) 104, captures audio 1302 and creates corresponding audio data. Once speech is detected in audio data representing the audio 1302, the user device(s) 104 may determine if the speech is directed at the user device(s) 104/system component(s). In at least some embodiments, such determination may be made using a wakeword detection component 1304. The wakeword detection component 1304 may be configured to detect various wakewords. In at least some examples, each wakeword may correspond to a name of a different digital assistant. An example wakeword/digital assistant name is "Alexa." In another example, input to the system may be in form of text data 1310, for example as a result of a user typing an input into a user interface of user device(s) 104. Other input forms may include indication that the user has pressed a physical or virtual button on user device(s) 104, the user has made a gesture, etc. The user device(s) 104 may also capture images using camera(s) of the user device(s) 104 and may send image data 1308 representing those image(s) to the system component(s). The image data 1308 may include raw image data or image data processed by the user device(s) 104 before sending to the system component(s). The image data 1308 may be used in various manners by different components of the system to perform operations such as determining whether a user is directing an utterance to the system, interpreting a user command, responding to a user command, etc.

The wakeword detection component 1304 of the user device(s) 104 may process the audio data, representing the audio 1302, to determine whether speech is represented therein. The user device(s) 104 may use various techniques to determine whether the audio data includes speech. In some examples, the user device(s) 104 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device(s) 104 may implement a classifier configured to distinguish speech from background noise. The classifier may be implemented by techniques such as linear classifiers, support vector machines, and decision trees. In still other examples, the user device(s) 104 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 1302, is analyzed to determine if specific characteristics of the audio data match preconfigured acoustic waveforms, audio signatures, or other data corresponding to a wakeword.

Thus, the wakeword detection component 1304 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1304 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 1304 and/or input is detected by an input detector, the user device(s) 104 may "wake" and begin transmitting audio data 1306, representing the audio 1302, to the system component(s) 110. The audio data 1306 may include data corresponding to the wakeword; in other embodiments, the portion of the audio corresponding to the wakeword is removed by the user device(s) 104 prior to sending the audio data 1306 to the system component(s) 110. In the case of touch input detection or gesture-based input detection, the audio data may not include a wakeword.

In some implementations, the system 900 may include more than one system component(s). The system component(s) 110 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 1304 may result in sending audio data to system component(s) for processing while detection of the wakeword "Computer" by the wakeword detector may result in sending audio data to system component(s)b for processing. The system may have a separate wakeword and system for different skills/systems (e.g., "Dungeon Master" for a game play skill/system component(s)c) and/or such skills/systems may be coordinated by one or more skill component(s) 1322 of one or more system component(s) 110.

The user device(s) 104/system component(s) may also include a system directed input detector 1320. The system directed input detector 1320 may be configured to determine whether an input to the system (for example speech, a gesture, etc.) is directed to the system or not directed to the system (for example directed to another user, etc.). The system directed input detector 1320 may work in conjunction with the wakeword detection component 1304. If the system directed input detector 1320 determines an input is directed to the system, the user device(s) 104 may "wake" and begin sending captured data for further processing. If data is being processed the user device(s) 104 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 1320 determines an input is not directed to the system (such as a speech or gesture directed to another user) the user device(s) 104 may discard the data and take no further action for processing purposes. In this way the system 900 may prevent processing of data not directed to the system, thus protecting user privacy. As an indicator to the user, however, the system may output an audio, visual, or other indicator when the system directed input detector 1320 is determining whether an input is potentially device directed. For example, the system may output an orange indicator while considering an input, and may output a green indicator if a system directed input is detected. Other such configurations are possible.

Upon receipt by the system component(s) 110, the audio data 1306 may be sent to an orchestrator component 1312 and/or the LLM orchestrator component 912. The orchestrator component 1312 may include memory and logic that enables the orchestrator component 1312 to transmit various pieces and forms of data to various components of the system, as well as perform other operations as described herein. In some embodiments, the orchestrator component 1312 may optionally be included in the system component(s) 110. In embodiments where the orchestrator component 1312 is not included in the system component(s) 110, the audio data 1306 may be sent directly to the LLM orchestrator component 912. Further, in such embodiments, each of the components of the system component(s) 110 may be configured to interact with the LLM orchestrator component 912, the action plan execution component 916, and/or the API provider component.

In one example, the message processing component 140 may be configured to interact with the LLM orchestrator component 912 to perform the operations described herein with respect to multi-channel AI architectures. For example, the message processing component 140 may provide data to the LLM orchestrator component 912, where the data may represent a communication of a user that was sent to the system 110. In some examples, the data may be text data 1310. The LLM orchestrator component 912 may process the data to generate tasks that may cause an action to be performed. For example, the LLM orchestrator component 912 may generate prompt data associated with the communication of the user to be used by an LLM, where the LLM may then determine an action plan.

In some embodiments, the system component(s) 110 may include an arbitrator component 1314, which may be configured to determine whether the orchestrator component 1312 and/or the LLM orchestrator component 912 are to process with respect to the audio data 1306. In some embodiments, the LLM orchestrator component 912 may be selected to process with respect to the audio data 1306 only if the user 902 associated with the audio data 1306 (or the user device(s) 104 that captured the audio 1302) has previously indicated that the LLM orchestrator component 912 may be selected to process with respect to user inputs received from the user 902.

In some embodiments, the arbitrator component 1314 may determine the orchestrator component 1312 and/or the LLM orchestrator component 912 are to process with respect to the audio data 1306 based on metadata associated with the audio data 1306. For example, the arbitrator component 1314 may be a classifier configured to process a natural language representation of the audio data 1306 (e.g., output by the ASR component 152) and classify the corresponding user input as to be processed by the orchestrator component 1312 and/or the LLM orchestrator component 912. For further example, the arbitrator component 1314 may determine whether the device from which the audio data 1306 is received is associated with an indicator representing the audio data 1306 is to be processed by the orchestrator component 1312 and/or the LLM orchestrator component 912. As an even further example, the arbitrator component 1314 may determine whether the user (e.g., determined using data output from the user recognition component 1316) from which the audio data 1306 is received is associated with a user profile including an indicator representing the audio data 1306 is to be processed by the orchestrator component 1312 and/or the LLM orchestrator component 912. As another example, the arbitrator component 1314 may determine whether the audio data 1306 (or the output of the ASR component 152) corresponds to a request representing that the audio data 1306 is to be processed by the orchestrator component 1312 and/or the LLM orchestrator component 912 (e.g., a request including "let's chat" may represent that the audio data 1306 is to be processed by the LLM orchestrator component 912).

In some embodiments, if the arbitrator component 1314 is unsure (e.g., a confidence score corresponding to whether the orchestrator component 1312 and/or the LLM orchestrator component 912 is to process is below a threshold), then the arbitrator component 1314 may send the audio data 1306 to both of the orchestrator component 1312 and the LLM orchestrator component 912. In such embodiments, the orchestrator component 1312 and/or the LLM orchestrator component 912 may include further logic for determining further confidence scores during processing representing whether the orchestrator component 1312 and/or the LLM orchestrator component 912 should continue processing, as is discussed further herein below.

The arbitrator component 1314 may send the audio data 1306 to an ASR component 152. In some embodiments, the component selected to process the audio data 1306 (e.g., the orchestrator component 1312 and/or the LLM orchestrator component 912) may send the audio data 1306 to the ASR component 152. The ASR component 152 may transcribe the audio data 1306 into text data. The text data output by the ASR component 152 represents one or more than one (e.g., in the form of an N-best list) ASR hypotheses representing speech represented in the audio data 1306. The ASR component 152 interprets the speech in the audio data 1306 based on a similarity between the audio data 1306 and pre-established language models. For example, the ASR component 152 may compare the audio data 1306 with models for sounds (e.g., acoustic units such as phonemes, senons, phones, etc.) and sequences of sounds to identify words that match the sequence of sounds of the speech represented in the audio data 1306. The ASR component 152 sends the text data generated thereby to the arbitrator component 1314, the orchestrator component 1312, and/or the LLM orchestrator component 912. In instances where the text data is sent to the arbitrator component 1314, the arbitrator component 1314 may send the text data to the component selected to process the audio data 1306 (e.g., the orchestrator component 1312 and/or the LLM orchestrator component 912). The text data sent from the ASR component 152 to the arbitrator component 1314, the orchestrator component 1312, and/or the LLM orchestrator component 912 may include a single top-scoring ASR hypothesis or may include an N-best list including multiple top-scoring ASR hypotheses. An N-best list may additionally include a respective score associated with each ASR hypothesis represented therein.

A skill system component(s) 1350 may communicate with a skill component(s) 1322 within the system component(s) 110 directly with the orchestrator component 1312 and/or the action plan execution component 916, or with other components. A skill system component(s) 1350 may be configured to perform one or more actions. An ability to perform such action(s) may sometimes be referred to as a "skill." That is, a skill may enable a skill system component(s) 1350 to execute specific functionality in order to provide data or perform some other action requested by a user. For example, a weather service skill may enable a skill system component(s) 1350 to provide weather information to the system component(s) 110, a car service skill may enable a skill system component(s) 1350 to book a trip with respect to a taxi or ride sharing service, an order pizza skill may enable a skill system component(s) 1350 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 110 may be configured with a skill component 1322 dedicated to interacting with the skill system component(s) 1350. Unless expressly stated otherwise, reference to a skill, skill device, or skill component may include a skill component 1322 operated by the system component(s) 110 and/or skill operated by the skill system component(s) 1350. Moreover, the functionality described herein as a skill or skill may be referred to using many different terms, such as an action, bot, app, or the like. The skill component 1322 and or skill system component(s) 1350 may return output data to the orchestrator component 1312.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 924. The TTS component 924 may generate audio data (e.g., synthesized speech) from text data using one or more different methods. Text data input to the TTS component 924 may come from a skill component 1322, the orchestrator component 1312, or another component of the system. In one method of synthesis called unit selection, the TTS component 924 matches text data against a database of recorded speech. The TTS component 924 selects matching units of recorded speech and concatenates the units together to form audio data. In another method of synthesis called parametric synthesis, the TTS component 924 varies parameters such as frequency, volume, and noise to create audio data including an artificial speech waveform. Parametric synthesis uses a computerized voice generator, sometimes called a vocoder.

The user device(s) 104 may include still image and/or video capture components such as a camera or cameras to capture one or more images. The user device(s) 104 may include circuitry for digitizing the images and/or video for transmission to the system component(s) 110 as image data. The user device(s) 104 may further include circuitry for voice command-based control of the camera, allowing a user 902 to request capture of image or video data. The user device(s) 104 may process the commands locally or send audio data 1306 representing the commands to the system component(s) 110 for processing, after which the system component(s) 110 may return output data that can cause the user device(s) 104 to engage its camera.

The system component(s) 110/the user device(s) 104 may include a user recognition component 1316 that recognizes one or more users using a variety of data. However, the disclosure is not limited thereto, and the user device(s) 104 may include the user recognition component 1316 instead of and/or in addition to the system component(s) 110 without departing from the disclosure.

The user recognition component 1316 may take as input the audio data 1306 and/or text data output by the ASR component 152. The user recognition component 1316 may perform user recognition by comparing audio characteristics in the audio data 1306 to stored audio characteristics of users. The user recognition component 1316 may also perform user recognition by comparing biometric data (e.g., fingerprint data, iris data, etc.), received by the system in correlation with the present user input, to stored biometric data of users assuming user permission and previous authorization. The user recognition component 1316 may further perform user recognition by comparing image data (e.g., including a representation of at least a feature of a user), received by the system in correlation with the present user input, with stored image data including representations of features of different users. The user recognition component 1316 may perform additional user recognition processes, including those known in the art.

The user recognition component 1316 determines scores indicating whether user input originated from a particular user. For example, a first score may indicate a likelihood that the user input originated from a first user, a second score may indicate a likelihood that the user input originated from a second user, etc. The user recognition component 1316 also determines an overall confidence regarding the accuracy of user recognition operations.

Output of the user recognition component 1316 may include a single user identifier corresponding to the most likely user that originated the user input. Alternatively, output of the user recognition component 1316 may include an N-best list of user identifiers with respective scores indicating likelihoods of respective users originating the user input. The output of the user recognition component 1316 may be used to inform processing of the arbitrator component 1314, the orchestrator component 1312, and/or the LLM orchestrator component 912 as well as processing performed by other components of the system.

The system component(s) 110/user device(s) 104 may include a presence detection component that determines the presence and/or location of one or more users using a variety of data.

The system 900 (either on user device(s) 104, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1318 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device(s) 104, the user profile (associated with the presented login information) may be updated to include information about the user device(s) 104, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 1318 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1318 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 13 may be illustrated as part of system component(s) 110, user device(s) 104, or otherwise, the components may be arranged in other device(s) (such as in user device(s) 104 if illustrated in system component(s) 110 or vice-versa, or in other device(s) altogether) without departing from the disclosure.

In at least some embodiments, the system component(s) may receive the audio data 1306 from the user device(s) 104, to recognize speech corresponding to a spoken input in the received audio data 1306, and to perform functions in response to the recognized speech. In at least some embodiments, these functions involve sending directives (e.g., commands), from the system component(s) to the user device(s) 104 (and/or other devices) to cause the user device(s) 104 to perform an action, such as output an audible response to the spoken input via a loudspeaker(s), and/or control secondary devices in the environment by sending a control command to the secondary devices.

Thus, when the user device(s) 104 is able to communicate with the system component(s) over the networks(s) 106, some or all of the functions capable of being performed by the system component(s) may be performed by sending one or more directives over the networks(s) 106 to the user device(s) 104, which, in turn, may process the directive(s) and perform one or more corresponding actions. For example, the system component(s), using a remote directive that is included in response data (e.g., a remote response), may instruct the user device(s) 104 to output an audible response (e.g., using TTS processing performed by an on-device TTS component) to a user's question via a loudspeaker(s) of (or otherwise associated with) the user device(s) 104, to output content (e.g., music) via the loudspeaker(s) of (or otherwise associated with) the user device (s) 104, to display content on a display of (or otherwise associated with) the user device(s) 104, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 902 as part of a shopping function, establishing a communication session (e.g., a video call) between the user 902 and another user, and so on.

In at least some embodiments, a hybrid selector, of the user device(s) 104, may send the audio data 1306 to the wakeword detection component 1304. If the wakeword detection component 1304 detects a wakeword in the audio data 1306, the wakeword detection component 1304 may send an indication of such detection to the hybrid selector. In response to receiving the indication, the hybrid selector may send the audio data 1306 to the system component(s) and/or the ASR component of the user device(s) 104. The wakeword detection component 1304 may also send an indication, to the hybrid selector, representing a wakeword was not detected. In response to receiving such an indication, the hybrid selector may refrain from sending the audio data 1306 to the system component(s), and may prevent the ASR component of the user device(s) 104 from further processing the audio data 1306. In this situation, the audio data 1306 can be discarded.

The user device(s) 104 may conduct its own speech processing using on-device language processing components, such as an ASR component, similar to the manner discussed herein with respect to the ASR component 152 of the system component(s). The user device(s) 104 may also internally include, or otherwise have access to, other components such as one or more skill components capable of executing commands based on the output of an orchestrator component, an LLM orchestrator, or other results determined by the user device(s) 104/system component(s) (which may operate similarly to skill components 1322), an arbitrator component (configured to process in a similar manner to that discussed herein above with respect to the arbitrator component 1314), an action plan execution component (configured to process in a similar manner to that discussed herein with respect to the action plan execution component 916), a context handler component (configured to process in a similar manner to that discussed herein with respect to the context handler component 926), a user recognition component (configured to process in a similar manner to that discussed herein with respect to the user recognition component 1316 of the system component(s)), profile storage (configured to store similar profile data to that discussed herein with respect to the profile storage 1318 of the system component(s)), or other components. In at least some embodiments, the profile storage may only store profile data for a user or group of users specifically associated with the user device(s) 104. Similar to as described above with respect to skill component 1322, a skill component of the user device(s) 104 may communicate with a skill system component(s) 1350. The user device(s) 104 may also have its own TTS component, which may operate similarly to TTS component 924.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device(s) 104 attempts to process a natural language user input for which the on-device language processing components are not necessarily best suited, the language processing results determined by the user device(s) 104 may indicate a low confidence or other metric indicating that the processing by the user device(s) 104 may not be as accurate as the processing done by the system component(s).

The hybrid selector, of the user device(s) 104, may include a hybrid proxy (HP) configured to proxy traffic to/from the system component(s). For example, the HP may be configured to send messages to/from a hybrid execution controller (HEC) of the hybrid selector. For example, command/directive data received from the system component(s) can be sent to the HEC using the HP. The HP may also be configured to allow the audio data 1306 to pass to the system component(s) while also receiving (e.g., intercepting) this audio data 1306 and sending the audio data 1306 to the HEC.

In at least some embodiments, the hybrid selector may further include a local request orchestrator (LRO) configured to notify the ASR component of the user device(s) 104 about the availability of new audio data 1306 that represents user speech, and to otherwise initiate the operations of local language processing when new audio data 1306 becomes available. In general, the hybrid selector may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device(s) 104 receives directive data from the system component(s) and chooses to use that remotely-determined directive data.

Thus, when the audio data 1306 is received, the HP may allow the audio data 1306 to pass through to the system component(s) and the HP may also input the audio data 1306 to the on-device ASR component by routing the audio data 1306 through the HEC of the hybrid selector, whereby the LRO notifies the on-device ASR component of the audio data 1306. At this point, the hybrid selector may wait for response data from either or both of the system component(s) or the local language processing components. However, the disclosure is not limited thereto, and in some examples the hybrid selector may send the audio data 1306 only to the local ASR component without departing from the disclosure. For example, the user device(s) 104 may process the audio data 1306 locally without sending the audio data 1306 to the system component(s).

The local ASR component is configured to receive the audio data 1306 from the hybrid selector, and to recognize speech in the audio data 1306. The user device(s) 104 and/or the system component(s) may associate a unique identifier with each natural language user input. The user device(s) 104 may include the unique identifier when sending the audio data 1306 to the system component(s), and the response data from the system component(s) may include the unique identifier to identify which natural language user input the response data corresponds.

In at least some embodiments, the user device(s) 104 may include, or be configured to use, one or more skill components that may work similarly to the skill component(s) 1322 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device(s) 104 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device(s) 104 may be in communication with one or more skill system component(s) 1350. For example, a skill system component(s) 1350 may be located in a remote environment (e.g., separate location) such that the user device(s) 104 may only communicate with the skill system component(s) 1350 via the networks(s) 106. However, the disclosure is not limited thereto. For example, in at least some embodiments, a skill system component(s) 1350 may be configured in a local environment (e.g., home server and/or the like) such that the user device(s) 104 may communicate with the skill system component(s) 1350 via a private network, such as a local area network (LAN).

A skill system component(s) 1350 may communicate with a skill component(s) 922 within the system component(s) 110 directly with the orchestrator component 1312 and/or the action plan execution component 916, or with other components. A skill system component(s) 1350 may be configured to perform one or more actions. An ability to perform such action(s) may sometimes be referred to as a "skill." That is, a skill may enable a skill system component(s) 1350 to execute specific functionality in order to provide data or perform some other action requested by a user. For example, a weather service skill may enable a skill system component(s) 1350 to provide weather information to the system component(s) 110, a car service skill may enable a skill system component(s) 1350 to book a trip with respect to a taxi or ride sharing service, an order pizza skill may enable a skill system component(s) 1350 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 110 may be configured with a skill component 922 dedicated to interacting with the skill system component(s) 1350. Unless expressly stated otherwise, reference to a skill, skill device, or skill component may include a skill component 922 operated by the system component(s) 110 and/or skill operated by the skill system component(s) 1350. Moreover, the functionality described herein as a skill or skill may be referred to using many different terms, such as an action, bot, app, or the like. The skill component 922 and or skill system component(s) 1350 may return output data to the orchestrator component 1312.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 924. The TTS component 924 may generate audio data (e.g., synthesized speech) from text data using one or more different methods. Text data input to the TTS component 924 may come from a skill component 922, the orchestrator component 1312, or another component of the system. In one method of synthesis called unit selection, the TTS component 924 matches text data against a database of recorded speech. The TTS component 924 selects matching units of recorded speech and concatenates the units together to form audio data. In another method of synthesis called parametric synthesis, the TTS component 924 varies parameters such as frequency, volume, and noise to create audio data including an artificial speech waveform. Parametric synthesis uses a computerized voice generator, sometimes called a vocoder.

The user device(s) 104 may include still image and/or video capture components such as a camera or cameras to capture one or more images. The user device(s) 104 may include circuitry for digitizing the images and/or video for transmission to the system component(s) 110 as image data. The user device(s) 104 may further include circuitry for voice command-based control of the camera, allowing a user 902 to request capture of image or video data. The user device(s) 104 may process the commands locally or send audio data 1306 representing the commands to the system component(s) 110 for processing, after which the system component(s) 110 may return output data that can cause the user device(s) 104 to engage its camera.

The system component(s) 110 may include a user recognition component 1316 that recognizes one or more users using a variety of data. The user recognition component 1316 may take as input the audio data 1306 and/or text data output by the ASR component 152. The user recognition component 1316 may perform user recognition by comparing audio characteristics in the audio data 1306 to stored audio characteristics of users. The user recognition component 1316 may also perform user recognition by comparing biometric data (e.g., fingerprint data, iris data, etc.), received by the system in correlation with the present user input, to stored biometric data of users assuming user permission and previous authorization. The user recognition component 1316 may further perform user recognition by comparing image data (e.g., including a representation of at least a feature of a user), received by the system in correlation with the present user input, with stored image data including representations of features of different users. The user recognition component 1316 may perform additional user recognition processes, including those known in the art.

The user recognition component 1316 determines scores indicating whether user input originated from a particular user. For example, a first score may indicate a likelihood that the user input originated from a first user, a second score may indicate a likelihood that the user input originated from a second user, etc. The user recognition component 1316 also determines an overall confidence regarding the accuracy of user recognition operations.

Output of the user recognition component 1316 may include a single user identifier corresponding to the most likely user that originated the user input. Alternatively, output of the user recognition component 1316 may include an N-best list of user identifiers with respective scores indicating likelihoods of respective users originating the user input. The output of the user recognition component 1316 may be used to inform processing of the arbitrator component 1314, the orchestrator component 1312, and/or the LLM orchestrator component 912 as well as processing performed by other components of the system.

The system component(s) 110/user device(s) 104 may include a presence detection component that determines the presence and/or location of one or more users using a variety of data.

The system 900 (either on user device(s) 104, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1318 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device(s) 104, the user profile (associated with the presented login information) may be updated to include information about the user device(s) 104, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 1318 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1318 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 13 may be illustrated as part of system component(s) 110, user device(s) 104, or otherwise, the components may be arranged in other device(s) (such as in user device(s) 104 if illustrated in system component(s) 110 or vice-versa, or in other device(s) altogether) without departing from the disclosure.

In at least some embodiments, the system component(s) may receive the audio data 1306 from the user device(s) 104, to recognize speech corresponding to a spoken input in the received audio data 1306, and to perform functions in response to the recognized speech. In at least some embodiments, these functions involve sending directives (e.g., commands), from the system component(s) to the user device(s) 104 (and/or other user devices) to cause the user device(s) 104 to perform an action, such as output an audible response to the spoken input via a loudspeaker(s), and/or control secondary devices in the environment by sending a control command to the secondary devices.

Thus, when the user device(s) 104 is able to communicate with the system component(s) over the networks(s) 106, some or all of the functions capable of being performed by the system component(s) may be performed by sending one or more directives over the networks(s) 106 to the user device(s) 104, which, in turn, may process the directive(s) and perform one or more corresponding actions. For example, the system component(s), using a remote directive that is included in response data (e.g., a remote response), may instruct the user device(s) 104 to output an audible response (e.g., using TTS processing performed by an on-device TTS component) to a user's question via a loudspeaker(s) of (or otherwise associated with) the user device(s) 104, to output content (e.g., music) via the loudspeaker(s) of (or otherwise associated with) the user device(s) 104, to display content on a display of (or otherwise associated with) the user device(s) 104, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 902 as part of a shopping function, establishing a communication session (e.g., a video call) between the user 902 and another user, and so on.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system comprising:

one or more processors; and one or more non-transitory computer-readable media storing computer-executable instructions that, when executed by the one or more processors, cause the one or more processors to perform operations comprising:

receiving first data representing a communication that was received at a first user device;

associating the communication with a user account, wherein the user account is associated with the first user device;

determining a first format associated with the communication, wherein the first format is one of multiple communication formats that the first user device is configured to receive;

generating, using the first data and a first preprocessing model configured to process data associated with the first format, preprocessed data representing the communication, wherein the first preprocessing model is selected from multiple preprocessing models, the multiple preprocessing models configured to preprocess communications in the multiple communication formats;

sending, to a message processing layer, the preprocessed data representing the communication, wherein a first portion of the preprocessed data is identified from the preprocessed data;

determining, using a large language model (LLM) associated with the message processing layer and based at least in part on the first portion of the preprocessed data, a first action associated with the communication;

selecting an application programming interface (API) to send a request to for executing the first action;

receiving, from a second user device associated with the user account, a request for information, wherein the information is at least partially included in the communication; and based at least in part on the communication being associated with the user account, causing the information to be output at the second user device.

2. The system of claim 1, wherein the communication is an email, the operations further comprising:

receiving second data representing a Short Message Service (SMS) message;

determining a second format associated with the SMS message;

generating, using the second data and a second preprocessing model configured to process data associated with the second format, preprocessed data representing the SMS message, wherein the second preprocessing model is selected from the multiple preprocessing models;

sending, to the message processing layer, the preprocessed data representing the SMS message, wherein a second portion of the preprocessed data is identified from the preprocessed data;

sending, to the LLM, the second portion of the preprocessed data and a set of instructions for processing the second portion of the preprocessed data;

determining, using the LLM and based at least in part on the second portion of preprocessed data and the set of instructions, a second action that is responsive to the SMS message; and selecting the API to send a request to for executing the second action.

3. The system of claim 1, the operations further comprising:

generating, based at least in part on the first action determined by the LLM, content data configured to be used by the first user device to output content corresponding to the content data, wherein the content includes at least a confirmation of the first action; and sending the content data to the first user device, the content data causing an application on the first user device to enable and display the content and an indication that the content is associated with the communication.

4. The system of claim 1, the operations further comprising:

generating a first vector representation of the first data, wherein the first vector representation is stored and associated with the user account;

receiving user input data at least partially associated with the communication;

generating a second vector representation of the user input data;

determining a similarity value indicating a similarity between the first vector representation and the second vector representation; and based at least in part on the similarity value, generating a response to the user input data utilizing the communication.

5. A method comprising:

receiving first data representing a document that was sent from a user at a first user device with a request to process the document;

associating the document with a user account;

determining a first format associated with the document, wherein the first format is one of multiple document formats;

generating, using the first data and a first model configured to process data associated with the first format, preprocessed data representing the document;

identifying a first portion of the preprocessed data from the preprocessed data;

determining, using a second model and based at least in part on the first portion of the preprocessed data, a first action associated with the document;

selecting an application programming interface (API) to send a request to for executing the first action;

receiving, from a second user device, a request for information, wherein the information is at least partially included in the document; and based at least in part on the document being associated with the user account, causing the information to be output at the second user device.

6. The method of claim 5, wherein the document is an email, further comprising:

receiving second data representing a Short Message Service (SMS) message;

determining a second format associated with the SMS message;

generating, using the second data and a third model configured to process data associated with the second format, preprocessed data representing the SMS message;

identifying a second portion of the preprocessed data from the preprocessed data;

sending, to the second model, the second portion of the preprocessed data and a set of instructions for processing the second portion of the preprocessed data;

determining, using the second model and based at least in part on the second portion of the preprocessed data and the set of instructions, a second action associated with the SMS message; and selecting the API to send a request to for executing the second action.

7. The method of claim 5, further comprising:

generating, based at least in part on the action determined by the second model, content data configured to be used by the first user device to output content corresponding to the content data, wherein the content includes at least a confirmation of the first action; and sending the content data to the first user device, the content data causing an application on the first user device to enable and display the content and an indication that the content is associated with the document.

8. The method of claim 5, further comprising:

generating a first representation of the first data, wherein the first representation is stored and associated with the user account;

receiving user input data;

generating a second representation of the user input data;

determining a similarity value indicating a similarity between the first representation and the second representation; and based at least in part on the similarity value, generating a response to the user input data.

9. The method of claim 5, further comprising:

generating, using the first data representing the document, preference data representing a user preference;

generating a first representation of the preference data;

receiving user input data, where in the user input data is associated with an input at a user device;

generating a second representation of the user input data;

determining a similarity value indicating a similarity between the first representation and the second representation; and determining, based at least in part on the similarity value, an action that is responsive to the input at the user device.

10. The method of claim 5, further comprising:

identifying a user account associated with the first user device;

determining identifying information associated with the document;

determining, from the identifying information, that the document is associated with the user account; and causing the action to be performed based at least in part on the document being associated with the user account.

11. The method of claim 5, further comprising:

determining that the first user device is utilizing an application predefined for extracting communications, wherein the application is linked to the user account and differs from the first model and the second model;

determining that the application is being utilized;

based at least in part on determining that the application is being utilized, querying for the document as displayed utilizing the application; and extracting the first data from the application without user input.

12. The method of claim 5, further comprising:

generating a notification indicating the action determined by the second model; and causing display of the notification in a foreground of the first user device, wherein the notification includes a selectable portion that, when selected, causes the action to be performed.

13. A system comprising:

one or more processors; and one or more non-transitory computer-readable media storing computer-executable instructions that, when executed by the one or more processors, cause the one or more processors to perform operations comprising:

receiving first data representing a document that was sent from a user at a first user device with a request to process the document;

associating the document with a user account;

determining a first format associated with the document, wherein the first format is one of multiple document formats;

generating, using the first data and a first model configured to process data associated with the first format, preprocessed data representing the document;

identifying a first portion of the preprocessed data from the preprocessed data;

determining, using a second model and based at least in part on the first portion of the preprocessed data, a first action associated with the document;

selecting an application programming interface (API) to send a request to for executing the first action;

receiving, from a second user device, a request for information, wherein the information is at least partially included in the document; and based at least in part on the document being associated with the user account, causing the information to be output at the second user device.

14. The system of claim 13, wherein the document is an email, the operations further comprising:

receiving second data representing a Short Message Service (SMS) message;

determining a second format associated with the SMS message;

generating, using the second data and a third model configured to process data associated with the second format, preprocessed data representing the SMS message;

identifying a second portion of the preprocessed data from the preprocessed data;

sending, to the second model, the second portion of the preprocessed data and a set of instructions for processing the second portion of the preprocessed data;

determining, using the second model and based at least in part on the second portion of the preprocessed data and the set of instructions, a second action associated with the SMS message; and selecting the API to send a request to for executing the second action.

15. The system of claim 13, the operations further comprising:

generating, based at least in part on the action determined by the second model, content data configured to be used by the first user device to output content corresponding to the content data, wherein the content includes at least a confirmation of the first action; and sending the content data to the first user device, the content data causing an application on the first user device to enable and display the content and an indication that the is associated with the document.

16. The system of claim 13, the operations further comprising:

generating a first representation of the first data, wherein the first representation is stored and associated with the user account;

receiving user input data;

generating a second representation of the user input data;

determining a similarity value indicating a similarity between the first representation and the second representation; and based at least in part on the similarity value, generating a response to the user input data.

17. The system of claim 13, the operations further comprising:

generating, using the first data representing the document, preference data representing a user preference;

generating a first representation of the preference data;

receiving user input data, where in the user input data is associated with an input at a user device;

generating a second representation of the user input data;

determining a similarity value indicating a similarity between the first representation and the second representation; and determining, based at least in part on the similarity value, an action that is responsive to the input at the user device.

18. The system of claim 13, the operations further comprising:

identifying a user account associated with the first user device;

determining identifying information associated with the document;

determining, from the identifying information, that the document is associated with the user account; and causing the action to be performed based at least in part on the document being associated with the user account.

19. The system of claim 13, the operations further comprising:

determining that the first user device is utilizing an application predefined for extracting communications, wherein the application is linked to the user account and differs from the first model and the second model;

determining that the application is being utilized;

based at least in part on determining that the application is being utilized, querying for the document as displayed utilizing the application; and extracting the first data from the application without user input.

20. The system of claim 13, the operations further comprising:

generating a notification indicating the action determined by the second model; and causing display of the notification in a foreground of the first user device, wherein the notification includes a selectable portion that, when selected, causes the action to be performed.

* * * * *